United States Patent
Nguyen et al.

(10) Patent No.: US 12,509,972 B2
(45) Date of Patent: Dec. 30, 2025

(54) SYNERGISTIC EFFECTS OF NANOPARTICLES AND SURFACTANTS FOR GAS LIFT FLOW IMPROVEMENT

(71) Applicant: ChampionX LLC, Sugar Land, TX (US)

(72) Inventors: Duy Nguyen, Richmond, TX (US); Bethany Dawn Carter, Houston, TX (US); Chad Michael Gilmer, Sugar Land, TX (US); Jenny L. Phan, Tomball, TX (US); Samuel Clay Marsh, Houston, TX (US)

(73) Assignee: ChampionX LLC, Sugar Land, TX (US)

( * ) Notice: Subject to any disclaimer, the term of this patent is extended or adjusted under 35 U.S.C. 154(b) by 0 days.

(21) Appl. No.: 18/679,647

(22) Filed: May 31, 2024

(65) Prior Publication Data

US 2024/0401446 A1  Dec. 5, 2024

Related U.S. Application Data

(60) Provisional application No. 63/505,787, filed on Jun. 2, 2023.

(51) Int. Cl.
*E21B 43/12* (2006.01)
*E21B 43/16* (2006.01)

(52) U.S. Cl.
CPC .......... *E21B 43/122* (2013.01); *E21B 43/166* (2013.01)

(58) Field of Classification Search
CPC .......... C09K 8/665; C09K 8/572; C09K 8/74; C09K 8/80; C09K 2208/10; E21B 43/267
See application file for complete search history.

(56) References Cited

U.S. PATENT DOCUMENTS

| | | | |
|---|---|---|---|
| 4,296,812 A | 10/1981 | Kalfoglou | |
| 9,562,188 B2 | 2/2017 | Monroe et al. | |
| 9,605,789 B2 | 3/2017 | Wray et al. | |
| 9,701,888 B2 | 7/2017 | Nguyen | |
| 9,725,640 B2 | 8/2017 | Tang et al. | |
| 9,862,881 B2 | 1/2018 | Drake et al. | |
| 9,873,827 B2 | 1/2018 | Chakraborty et al. | |
| 10,377,942 B2 | 8/2019 | Southwell et al. | |
| 10,557,078 B2 | 2/2020 | Southwell | |
| 2003/0068486 A1 | 4/2003 | Arney et al. | |
| 2004/0102529 A1 | 5/2004 | Campbell et al. | |
| 2004/0180795 A1 | 9/2004 | Su et al. | |
| 2005/0228074 A1 | 10/2005 | Warren et al. | |
| 2006/0155376 A1 | 7/2006 | Asgari | |
| 2009/0156757 A1 | 6/2009 | Wang et al. | |
| 2010/0096139 A1 | 4/2010 | Holcomb et al. | |
| 2011/0071060 A1* | 3/2011 | Nguyen | C09K 8/703 507/265 |
| 2011/0171123 A1 | 7/2011 | Shirtliff et al. | |
| 2011/0256403 A1 | 10/2011 | Wang et al. | |
| 2012/0015852 A1 | 1/2012 | Quintero et al. | |
| 2012/0168165 A1 | 7/2012 | Holcomb et al. | |
| 2012/0175120 A1 | 7/2012 | Holcomb et al. | |
| 2012/0201806 A1 | 8/2012 | Silverstein et al. | |
| 2012/0208029 A1* | 8/2012 | Lin | C09D 183/08 524/521 |
| 2012/0285690 A1 | 11/2012 | Weaver et al. | |
| 2012/0296124 A1 | 11/2012 | Asefa et al. | |
| 2013/0040069 A1 | 2/2013 | Craton et al. | |
| 2013/0324627 A1 | 12/2013 | Silverstein et al. | |
| 2014/0051186 A1 | 2/2014 | Aizawa et al. | |
| 2014/0332212 A1 | 11/2014 | Ayers et al. | |
| 2015/0218921 A1 | 8/2015 | Suresh et al. | |
| 2016/0068664 A1 | 3/2016 | Suemura et al. | |
| 2016/0083639 A1 | 3/2016 | Xu et al. | |
| 2016/0362594 A1 | 12/2016 | Rojas et al. | |
| 2017/0009085 A1 | 1/2017 | Bai et al. | |
| 2017/0096597 A1 | 4/2017 | Hu et al. | |
| 2018/0112122 A1 | 4/2018 | Phan et al. | |
| 2018/0134949 A1 | 5/2018 | Monastiriotis et al. | |
| 2018/0265766 A1 | 9/2018 | Peng et al. | |
| 2018/0282615 A1 | 10/2018 | Khamatnurova et al. | |
| 2018/0291253 A1 | 10/2018 | Salla et al. | |
| 2018/0327652 A1 | 11/2018 | Kuznetsov et al. | |
| 2018/0362834 A1 | 12/2018 | Haghighi et al. | |
| 2019/0010382 A1* | 1/2019 | Kuznetsov | C09K 8/584 |

(Continued)

FOREIGN PATENT DOCUMENTS

| | | |
|---|---|---|
| CN | 103214631 B | 7/2015 |
| CN | 109825144 A | 5/2019 |

(Continued)

OTHER PUBLICATIONS

Alvarez-Berrios et al. "Effect of the surface charge of silica nanoparticles on oil recovery: wettability alteration of sandstone cores and imbibition experiments." International Nano Letters 8 (2018): 181-188.

Zallaghi et al. "Improving the microscopic sweep efficiency of water flooding using silica nanoparticles." Journal of Petroleum Exploration and Production Technology 8 (2018): 259-269.

Ahangaran F, Navarchian AH. Recent advances in chemical surface modification of metal oxide nanoparticles with silane coupling agents: A review. Advances in Colloid and Interface Science. Dec. 1, 2020;286:21 pages.

Cao J, Song T, Zhu Y, Wang S, Wang X, Lv F, Jiang L, Sun M. Application of amino-functionalized nanosilica in improving the thermal stability of acrylamide-based polymer for enhanced oil recovery. Energy & fuels. Jan. 18, 2018;32(1):246-54.

Cao J, Song T, Zhu Y, Wang X, Wang S, Yu J, Ba Y, Zhang J. Aqueous hybrids of amino-functionalized nanosilica and acrylamide-based polymer for enhanced oil recovery. RSC advances. 2018;8(66):38056-64.

(Continued)

*Primary Examiner* — Silvana C Runyan
(74) *Attorney, Agent, or Firm* — McKee, Voorhees & Sease, PLC

(57) ABSTRACT

Compositions of nanoparticles and surfactants for enhanced gas lift through increased foaming heights and foam stability are disclosed. More specifically, synergistic combination of nanoparticles, including amine functionalized colloidal nanoparticles and surfactants, provides enhanced gas lift and increased oil production are disclosed. Methods of using are also disclosed.

11 Claims, 9 Drawing Sheets

(56) References Cited

U.S. PATENT DOCUMENTS

| | | | |
|---|---|---|---|
| 2019/0055825 A1 | 2/2019 | Babcock et al. | |
| 2019/0062495 A1 | 2/2019 | Meng et al. | |
| 2019/0078016 A1 | 3/2019 | Southwell et al. | |
| 2019/0136123 A1 | 5/2019 | Holcomb et al. | |
| 2019/0299184 A1 | 10/2019 | Suresh et al. | |
| 2019/0382693 A1* | 12/2019 | St. Peter | A01N 57/34 |
| 2020/0157417 A1 | 5/2020 | Bhaduri et al. | |
| 2020/0216745 A1 | 7/2020 | Rama et al. | |
| 2021/0040381 A1 | 2/2021 | Holcomb et al. | |
| 2021/0222059 A1 | 7/2021 | Southwell et al. | |
| 2022/0135871 A1 | 5/2022 | Duncan et al. | |
| 2023/0037819 A1 | 2/2023 | Nguyen et al. | |
| 2023/0080032 A1 | 3/2023 | Xie et al. | |
| 2023/0332041 A1 | 10/2023 | Nguyen et al. | |

FOREIGN PATENT DOCUMENTS

| | | |
|---|---|---|
| KR | 100791831 B1 | 1/2008 |
| KR | 101104390 B1 | 1/2012 |
| KR | 101126708 B1 | 3/2012 |
| KR | 101872020 B1 | 6/2018 |
| WO | 2009044912 A1 | 4/2009 |
| WO | 2017136641 A1 | 8/2017 |

OTHER PUBLICATIONS

Eshkalak S, Kowsari E, Chinnappan A, Ramakrishna S. Study of silanized-TiO 2 nanoparticles modification by ionic liquid for white electronic ink applications. Journal of Materials Science: Materials in Electronics. Jun. 30, 2019;30:11307-16.

Griffith CA. Colloidal particles at fluid interfaces: from stabilizing emulsions to destabilizing them (Doctoral dissertation), May 2019, 251 pages.

International Search Report and Written Opinion in PCT/US23/65756, mailed Aug. 28, 2023, 15 pages.

Mousavi M, Fini E. Silanization mechanism of silica nanoparticles in bitumen using 3-aminopropyl triethoxysilane (APTES) and 3-glycidyloxypropyl trimethoxysilane (GPTMS). ACS sustainable chemistry & engineering. Feb. 10, 2020;8(8):3231-40.

Schmidt HK, Arpac E, Schirra H, Sepeur S, Jonschker G, Claflin B, Lucovsky G. Aqueous sol-gel derived nanocomposite coating materials. MRS Online Proceedings Library (OPL). Jan. 1998;519:297-308.

International Search Report and Written Opinion in PCT/US2024/031816, mailed Sep. 3, 2024, 12 pages.

Alomair et al. "Nanofluids application for heavy oil recovery." SPE Asia Pacific oil and gas conference and exhibition. SPE (2014): 1-18.

Behzadi et al. "Environmentally responsive surface-modified silica nanoparticles for enhanced oil recovery." Journal of Nanoparticle Research 18 (2016): 1-19.

Cheraghian et al. "Silica nanoparticle enhancement in the efficiency of surfactant flooding of heavy oil in a glass micromodel." Industrial & Engineering Chemistry Research 56.30 (2017): 8528-8534.

Dai et al. "Spontaneous imbibition investigation of self-dispersing silica nanofluids for enhanced oil recovery in low-permeability cores." Energy & Fuels 31.3 (2017): 2663-2668.

International Search Report and Written Opinion in PCT/US2020/032848, mailed Jan. 9, 2020, 9 pages.

Ko et al. "Efficient removal of EOR polymer from produced water using magnetic nanoparticles and regeneration/re-use of spent particles." SPE Improved Oil Recovery Conference. SPE (2016): 1-13.

Li et al. "Investigation of spontaneous imbibition by using a surfactant-free active silica water-based nanofluid for enhanced oil recovery." Energy & Fuels 32.1 (2018): 287-293.

Mcelfresh et al. "Stabilizing nano particle dispersions in high salinity, high temperature downhole environments." SPE International Oilfield Nanotechnology Conference and Exhibition. SPE (2012): 1-6.

Ogolo et al. "Enhanced oil recovery using nanoparticles." SPE Kingdom of Saudi Arabia Annual Technical Symposium and Exhibition. SPE (2012): 1-9.

Yuyang et al. "Study on enhanced oil recovery of water-based nanofluid with functional silica nanoparticles." SPE Asia Pacific Oil and Gas Conference and Exhibition. SPE (2017): 1-8.

* cited by examiner

SYNERGISTIC EFFECTS OF NANOPARTICLES AND SURFACTANTS FOR GAS LIFT FLOW IMPROVEMENT

CROSS REFERENCE TO RELATED APPLICATIONS

This application claims priority under 35 U.S.C. § 119 to provisional patent application U.S. Ser. No. 63/505,787, filed Jun. 2, 2023. The provisional patent application is herein incorporated by reference in its entirety, including without limitation, the specification, claims, and abstract, as well as any figures, tables, appendices, or drawings thereof.

TECHNICAL FIELD

The present disclosure relates generally to combinations of nanoparticles and surfactants for enhanced gas lift through increased foaming heights and foam stability. More specifically, synergistic combination of nanoparticles, including amine functionalized colloidal nanoparticles and surfactants, provides enhanced gas lift and increased oil production are disclosed.

BACKGROUND

The use of chemical additives for various enhanced oil recovery techniques are widely adapted to increase the rate or amount of hydrocarbon compounds recovered from hydrocarbon-bearing subterranean formations. Conventional uses of chemical additives include surfactants or polymers combined with a fluid, such as a water source, for underground injection. Surfactant chemical additives are used to lower interfacial tensions between the fluid and/or connate (subterranean water source) and the hydrocarbon (oil) and also increase wettability of the subterranean formation rock to increase yield of hydrocarbon compounds released and/or the rate of their recovery.

An additional class of additives to enhance hydrocarbon recovery includes gas lift flow improvers. These chemical additives are used in oil and gas wells where reservoir pressure exceeds the well's hydrostatic pressure, and where modification of the pressure difference can impact fluids' ability to move up the wellbore to the surface. As reservoir pressures decline over time, less liquid moves up to the surface and a gas lift flow improver can be utilized to enhance recovery. It is desirable to increase fluid velocity to the surface and/or reduce fluid density. Often gas lift is achieved through use of intermittent or continuous gas lift by injecting high pressure gas into a well. Chemical solutions to improving gas lift flow are also desired.

There is an ongoing need to enhance the properties of chemical additives to overcome limitations on their performance. For example, various chemical additives can become unstable when combined with brine (saline water sources) or high total dissolved solids (TDS), causing precipitation and decreasing its dispersion in an aqueous solution, thereby reducing its efficacy. There is also an ongoing need to enhance the thermal stability of chemical additives to overcome additional limitations on their performance. For example, various surfactant chemical additives become unstable or insoluble at high temperatures, such as in some subterranean formations where temperatures can exceed 60° C. or even reach temperatures as high as 250° C. It is an object of the disclosure to utilize nanoparticles that have suitable stability in high temperature and high salinity conditions.

It is an object of the disclosure to provide gas lift flow improving compositions utilizing functionalized nanoparticles combined with foaming surfactants.

It is a further object of the disclosure to provide methods of improving gas lift flow in a subterranean formation using the gas lift flow improving compositions.

It is still another object of the disclosure to provide methods of using the gas lift flow improving compositions in various applications of use in need of lowering the fluid density to improve gas lift flow in a subterranean formation or well.

Other objects, embodiments and advantages of this disclosure will be apparent to one skilled in the art in view of the following disclosure, the drawings, and the appended claims.

BRIEF SUMMARY

According to an aspect of the present disclosure, gas lift flow improving compositions comprise: a functionalized nanoparticle, wherein the nanoparticle has an average particle size from about 1 nm to about 1000 nm; a foaming surfactant comprising an amphoteric, anionic and/or nonionic surfactant; and wherein the composition is dispersed in an aqueous medium.

According to an additional aspect of the present disclosure, an injectate composition comprises a water source and the composition as described herein or a water source a gas lift flow improving components comprising functionalized nanoparticles having an average particle size from about 1 nm to about 1000 nm and a foaming surfactant comprising an amphoteric, anionic and/or nonionic surfactant.

According to an additional aspect of the present disclosure, use of the injectate composition increases the gas lift of hydrocarbon from a subterranean formation, rate of hydrocarbon recovery from a subterranean formation, total yield of hydrocarbon recovered from a subterranean formation, or combinations thereof.

According to an additional aspect of the present disclosure, methods of improving gas lift flow in a subterranean formation comprise introducing an injectate as described herein or a gas lift flow improving composition as described herein into a fluid comprising hydrocarbon or condensate in a subterranean formation or well, and lowering the fluid density to improve gas lift flow or increase production in the subterranean formation or well.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described. While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

Figure 1A:
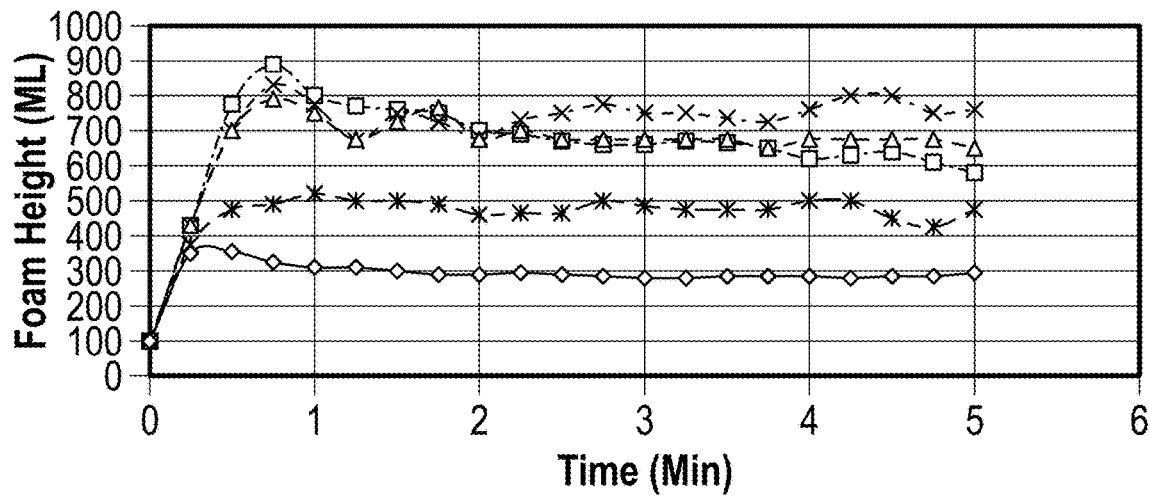
FIG. 1A shows a graph measuring foam height (ml) over time in 20% water cut fluid treated with varying ratios of nanoparticle (NP) to alkyl betaine surfactants as described in Example 1.

Various embodiments of the present disclosure will be described in detail with reference to the drawings, wherein like reference numerals represent like parts throughout the several views. Reference to various embodiments does not limit the scope of the invention. Figures represented herein are not limitations to the various embodiments and are presented for exemplary illustration of the various embodiments, which is defined by the scope of the appended claims. An artisan of ordinary skill in the art need not view, within isolated figure(s), the near infinite number of distinct permutations of features described in the following detailed description to facilitate an understanding of the present invention.

DETAILED DESCRIPTION

The present disclosure is not to be limited to the exemplary gas lift flow improving compositions described herein, which can vary and are understood by skilled artisans. No features shown or described are essential to permit basic operation of the present disclosure unless otherwise indicated. It has been surprisingly found that a synergistic benefit to thermal and brines stability of amine functionalized nanoparticles is achieved when the nanoparticles are stabilized with the combination of a first step of coating with a trialkoxyorganosilane and thereafter functionalizing with an amine functionalized group on the surface of the nanoparticle.

It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects and embodiments are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions. This applies regardless of the breadth of the range.

As used herein, the term "and/or", e.g., "X and/or Y" shall be understood to mean either "X and Y" or "X or Y" and shall be taken to provide explicit support for both meanings or for either meaning, e.g. A and/or B includes the options i) A, ii) B or iii) A and B.

It is to be appreciated that certain features that are, for clarity, described herein in the context of separate embodiments, may also be provided in combination in a single embodiment. Conversely, various features that are, for brevity, described in the context of a single embodiment, may also be provided separately or in any sub-combination.

The methods and compositions of the present disclosure may comprise, consist essentially of, or consist of the components and ingredients of the present disclosure as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Unless defined otherwise, all technical and scientific terms used above have the same meaning as commonly understood by one of ordinary skill in the art to which embodiments of the present disclosure pertain.

The terms "invention" or "present invention" are not intended to refer to any single embodiment of the particular invention but encompass all possible embodiments as described in the specification and the claims.

The term "about," as used herein, refers to variation in the numerical quantity that can occur, for example, through typical measuring techniques and equipment, with respect to any quantifiable variable, including, but not limited to, mass, concentration, volume, time, temperature, yield, flow rate, pressure, pH, and the like. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups. In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "enhanced hydrocarbon recovery" or "enhanced oil recovery" refers to injection of compositions into a subterranean formation to increase the rate or total amount of hydrocarbon collected from a previously established well. Enhanced hydrocarbon recovery includes "secondary hydrocarbon (oil) recovery" which includes injection initiated when a reduction in the rate of flow of hydrocarbon from a well is observed. Enhanced hydrocarbon recovery also includes "tertiary hydrocarbon (oil) recovery," which includes injection initiated when rate of flow of hydrocarbon from a well has stopped or substantially stopped.

As used herein, the term "exemplary" refers to an example, an instance, or an illustration, and does not indicate a most preferred embodiment unless otherwise stated.

As used herein, the term "free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

As used herein, the term "high pressure" means pressure in excess of atmospheric pressure on the surface of the earth, or as encountered within one or more subterranean formations or subterranean formations as a result of natural forces present within the subterranean formation, as a result of human activity such as hydraulic fracturing, or a combination thereof.

As used herein, the term "high temperature" refers to a water source, a subterranean formation, or a combination thereof having a temperature of about 60° C. to 250° C., or about 60° C. to 120° C., as specified or determined by context.

As used herein, the term "high total dissolved solids" refers to a water source including at least about 0.5 wt % solids dissolved therein, and in some embodiments up to about 30 wt % solids dissolved therein. In general, "saline" or "salinity" refers to a water source wherein a portion or a substantial portion of the total dissolved solids are salts.

As used herein, the term "hydrocarbon" generally refers to crude petroleum products, such as crude oil or natural gas products such as methane, unless otherwise specified or determined by context. Crude petroleum products are hydrocarbon compounds as recovered or collected from a subterranean formation, and prior to any further processing or refining thereof.

As used herein, the term "injectate" means a composition for injecting into a subterranean formation, or a composition that is injected into a subterranean formation, or a composition previously injected into a subterranean formation and present therein. The injectate may further include a proppant, wherein the combination of injectate and proppant is referred to herein as a "fracturing fluid." Discussions related to injectates and injection of injectates generally also relates to fracturing fluids and injection of fracturing fluids, as specified or determined by context. It will be understood that the proppant present in a fracturing fluid does not materially affect the chemical properties of the injectate but instead is chemically inert or substantially chemically inert within the fracturing fluid. As such, discussions relating to improved rate or yield of hydrocarbon from a subterranean formation due to injection of an injectate, including modification of properties such as interfacial energy or rock surface wettability also apply generally to fracturing fluids, unless otherwise specified or determined by context.

As used herein, the term "nanoparticle" means particles having at least one dimension less than 1000 nm.

The term "produced water" refers to a water source that is present within and/or flows from a subterranean formation; produced water includes connate unless otherwise specified.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The term "substantially" refers to a great or significant extent. "Substantially" can thus refer to a plurality, majority, and/or a supermajority of said quantifiable variable, given proper context.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

As used herein, the term "surfactant" means a compound having at least one hydrophilic portion and at least one hydrophobic portion, wherein the compound is capable of spontaneous self-aggregation in aqueous compositions. Surfactants can also be referred to as "surface active agents" as they change the properties of a liquid at a surface when added to a liquid. Cationic surfactants have no anionic moieties covalently bonded to the molecule and one or more cationic moieties covalently bonded to the molecule. Anionic surfactants have no cationic moieties covalently bonded to the molecule and one or more anionic moieties covalently bonded to the molecule. Nonionic surfactants refer to those having no ionic moieties covalently bonded to the molecule. Amphoteric surfactants refer to those having one or more anionic moieties covalently bonded to the molecule and one or more cationic moieties covalently bonded to the molecule, and a net molecular charge of zero as they are electrically neutral compounds having formal unit electrical charges of opposite sign.

As used herein, the word "treatment" refers to any treatment for changing a condition of a wellbore or a subterranean formation. Examples of treatments include fluid-loss control, isolation, stimulation, or conformance control; however, the word "treatment" does not necessarily imply any particular treatment purpose.

As used herein, the term "water source" means a source of water comprising, consisting essentially of, or consisting of fresh water, tap water, well water, deionized water, distilled water, produced water, municipal water, waste water such as runoff water, "gray" water, or municipal waste water, treated or partially treated waste water, brackish water, or sea water, or a combination of two or more such water sources as determined by context. In some embodiments, a water source includes one or more salts, ions, buffers, acids, bases, surfactants, or other dissolved, dispersed, or emulsified compounds, materials, components, or combinations thereof. In some embodiments, a water source includes about 0 wt % to 35 wt % total dissolved solids. In some such embodiments, the total dissolved solids are substantially non-polymeric solids. In some such embodiments, the dissolved solids comprise, consist essentially of ionic compounds. Generally, the term "water source" includes all of the following unless otherwise specified or determined by context: water, connate, produced water, water having high total dissolved solids, water having high temperature, and water having both high total dissolved solids and high temperature. The terms "water based", "water solution", "aqueous" and the like generally refer to a composition including a water source The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

As used herein, the term "well" refers to a fluid connection between a hydrocarbon within a subterranean formation, and a point proximal to the surface of the earth suitably situated to collect at least a portion of the hydrocarbon. Optionally, the point of collection is further adapted to collect the hydrocarbon, or to inject an injectate into the subterranean formation, or both. Similarly, the term "wellbore" refers to a man-made fluid connection to a hydrocarbon within a subterranean formation. A wellbore is adapted to collect the hydrocarbon, or to inject an injectate into the subterranean formation, or both, for example by including one or more pipes, tanks, pumps and the like. A well may include one wellbore, or two or more wellbores.

Compositions

The gas lift flow improving compositions comprise a functionalized nanoparticle and at least one foaming surfactant comprising an amphoteric, anionic and/or nonionic surfactant, wherein the composition is dispersed in an aqueous medium. The compositions can be provided as concentrates, injectates, fracturing fluids, and/or the like.

Functionalized Nanoparticles

As referred to herein, the functionalized nanoparticles are surface modified nanoparticles. The functionalized nanoparticles provide improved stable nanoparticles suitable for synergistic combination with surfactants to improve gas lift flow in the various applications of use described herein. The gas lift flow is understood to refer to a lowering of the fluid density to improve gas lift flow which increases production in the subterranean formation or well.

Nanoparticles are particles that have at least one dimension less than about 1000 nm. The nanoparticles selected for amine functionalization for improved thermal and brine stability have at least one dimension ranging from about 1-1000 nm. In some embodiments, the nanoparticles range from 1-500 nm; 1-400 nm; 1-250 nm; 1-100 nm; 1-50 nm; 200-500 nm; 200-400 nm; or 300-400 nm. In some embodiments a nanoparticle can have one of its dimensions larger than 1000 nm while another dimension is less than about 1000 nm and therefore it is considered a nanoparticle. In some embodiments, the size of a nanoparticle refers to the diameter or approximate diameter of a nanoparticle. For a population of nanoparticles, this can also be referred to as a Z-average particle size, which can be measured according to routine protocols known to one skilled in the art. In some embodiments, the size is measured by dynamic light scattering (DLS) (Z-average). In some embodiments, the size is measured by Transmission Electron Microscopy (TEM).

In some embodiments the nanoparticles selected for functionalization and use in the gas lift flow improving compositions have an average particle size that is from about 1-1000 nm. In some embodiments, the nanoparticles average particle size range from 1-500 nm; 1-400 nm; 1-250 nm; 1-100 nm; 1-50 nm; 200-500 nm; 200-400 nm; or 300-400 nm.

The nanoparticles can assume a variety of geometries, such as spheres, hollow shells, rods, plates, ribbons, prisms, stars, and combinations thereof. All geometries of nanoparticles can be employed as described herein.

Various nanoparticles can be modified to be functionalized, including silica and metal-based nanoparticles. Silica nanoparticles include nanosilica, silicate nanoparticles, polyhedral oligomeric silsesquioxane (POSS) nanoparticles, colloidal silica, silicon dioxide nanoparticle dispersion (SDND), etc. Metal based nanoparticles include, for example, aluminum, chromium, cobalt, copper, gold, iron, magnesium, nickel, platinum, silver, tin, titanium, zinc, and zirconium nanoparticles. In embodiments, the metal-based nanoparticles are transition metals. The nanoparticles described herein can also include mineral oxide nanoparticles. For example, the nanoparticles are aluminum oxide, antimony dioxide, copper oxide, iron oxide, magnesium oxide, nickel oxide, silicon dioxide, titanium oxide, zinc oxide, or zirconium dioxide nanoparticles.

In some embodiments, the nanoparticles are selected from are $Al_2O_3$, $Al(OH)_3$, $Bi_2O_3$, $CeO_2$, $CoO$, $Co_2O_3$, $CO_3O_4$, $Cr_2a_3$, $CuO$, $Cu_2O$, $Cu(OH)_2$, $Fe_2O_3$, $Fe_3O_4$, $MgO$, $Mg(OH)_2$, $MgCO_3$, $MnO_2$, $Mn_3O_4$, $Ni(OH)_2$, $NiO$, $SiO_2$, $SnO_2$, $TiO_2$, $ZnO$, $ZnCO_3$, $ZrO_2$, and $Zr(OH)_4$. In some embodiments, any of the nanoparticles described herein are selected from the group consisting of $BaCO_3$, $BaTiO_3$, $BaSO_4$, $CoFc_2O_4$, $CaCO_3$, $MnFc_2O_4$, $MgCO_3$, $ZnCO_3$, $SrCO_3$, and $SrTiO_3$.

In embodiments where non-silica nanoparticles are employed, they can be treated or prepared to have a surface layer of silica for further surface modification (hereinafter referred to as silica surface-modified nanoparticles). In some embodiments, the nanoparticles are silica nanoparticles or alumina nanoparticles. In further embodiments, the nanoparticles are colloidal silica nanoparticles or colloidal alumina nanoparticles. In exemplary embodiments, the silica nanoparticles are silicon dioxide nanoparticles or colloidal silicon dioxide nanoparticles.

In embodiments, the nanoparticles do not include ceramics, which are convention for use in improving tensile strength properties. Without being limited to a particular mechanism of action or intended use, the size of ceramics exceed that of desired nanoparticles and prevent further challenges in its ability to stabilize in aqueous system. In further embodiments, the nanoparticles for amine functionalization do not include carbon nanoparticles which require distinct surface modification from those described herein. The nanoparticles do not include carbon or carbon-based materials, such as carbon nanotubes (e.g., single-walled carbon nanotubes (SWCNTs), multi-walled carbon nanotubes (MWCNTs), and combinations thereof), carbon nanodiamonds, graphite, graphene, graphene oxide, fullerenes, and combinations thereof.

Several methods are known for attaching functional groups (e.g. silica) to the nanoparticles to provide surface-modified nanoparticles such as silica. See, e.g., Ralph K. Iler, The Chemistry of Silica: Solubility, Polymerization, Colloid and Surface Properties, and Biochemistry, Wiley-Interscience, NY, 1979; VanDerVoort, P. and Vansant, E. F., Journal of Liquid Chromatography and Related Technologies, 19:2723-2752, 1996; or Energy & Fuels 2017, 31, 2663-2668; Soft Matter, 2016, 12, 2025-2039; SPE-179576-MS presented at the SPE Improved Oil Recovery Conference, 11-13 Apr. 2016; SPE-186328-MS presented at the SPE/ATMI Asia Pacific Oil & Gas Conference and Exhibition, 17-19 Oct. 2017; Energy & Fuels 2018, 32, 287-293.

The chemical group can itself be the functional group, or it can serve as a substrate to which other functional groups can be coupled. Therefore, in some embodiments, the morphology for nanoparticles is a "core-shell" morphology, where a core comprises material other than silica and the shell comprises silica.

In some embodiments the silica nanoparticles are surface treated with silane surface-coupling agents. In some embodiments, the nanoparticle surfaces are modified with surface-coupling agents derived from organic silane surface groups. The surface-coupling agent is selected from silane, aryl silane, alkoxysilane, alkyl, and combinations thereof. In some embodiments, the silane surface-coupling agents have epoxy groups. In some embodiments the silane coupling agents are 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-glycidoxypropyltriethoxysilane, 2-(3,4-epoxycyclohexyl) propyltrimethoxysilane, 2-(3,4-epoxycyclohexyl)propyltriethoxysilane, 2-(3,4-epoxycyclohexyl)ethyltrimethoxysilane, 2-(3,4-epoxycyclohexyl)ethyltriethoxysilane, 2-(3,4-epoxycyclohexyl)methyltrimethoxysilane, 2-(3,4-epoxycyclohexyl)methyltriethoxysilane, [(3-ethyl-3-oxethanyl) methoxy]propyltrimethoxysilane, and [(3-ethyl-3-oxethanyl) methoxy]propyltriethoxysilane.

In some embodiments, the ratio of the surface modification compound to the nanoparticle (e.g. colloidal nanoparticles) is 0.1 to 15; 0.1:10; or 0.1:5 based on the mass of silica solid content. In some embodiments, the ratio of silane compound to the silica (e.g. colloidal silica) is 0.01 to 15; 0.1 to 15; 0.1:10; 0.1:5; or 0.01 to 5 based on the mass of silica solid content.

In some embodiments, the surface-modified nanosilica particles are used for producing zwitterionic groups as a reaction of a silane molecule with a silica surface. In some embodiments the silane is a zwitterionic silane. In some embodiments a zwitterionic silane is zwitterionic sulfonate functional silane, zwitterionic carboxylate functional silane, zwitterionic phosphate functional silane, zwitterionic phosphonic acid functional silane. In some embodiments a zwitterionic silane is N,N-dimethyl,N-(2-ethyl phosphate ethyl)-aminopropyltri-methyoxysilane (DMPAMS) or 3-(dimethyl (3-(trimethoxysilyl) propyl)-ammonio) propane-1-sulfonate or 3-(dimethyl (3-(triethoxysilyl) propyl)-ammonio) propane-1-sulfonate; or 3-(diethyl (3-(trimethoxysilyl) propyl)-ammonio) propane-1-sulfonate.

Additional description of exemplary functionalized, i.e. surface-modified, nanoparticles is described in U.S. Patent Publication No. 2023/0037819, which is incorporated herein in its entirety.

In embodiments the functionalized nanoparticle can further be an amine functionalized nanoparticle. In exemplary embodiments the nanoparticles have a core-shell nanoparticle morphology. The nanoparticle has as amine functionalized group covalently bonded to a trialkoxyorganosilane coated nanoparticle. In particular the trialkoxyorganosilane is covalently bonded to the amine-functionalized silanes. The covalent bonding between the core-shell structure of the nanoparticle is distinct from various types of functionalized or modified nanoparticles that do not have covalently bonded functional groups and instead rely on sol-gel formulations which can easily be converted to different structures (i.e., gel by cooling and sol by heating). Often the sol-gel structures are used for combining with nanoparticles, e.g., in composites, as opposed to providing a stabilized nanoparticle for dispersion in an aqueous medium.

As referred to herein, the core-shell nanoparticle morphology refers to a trialkoxyorganosilane coated nanoparticle as the core and the shell comprising an amine functionalized group provided by an amine-containing silane on the surface of the nanoparticle. The core is the nanoparticle that is first functionalized with a covalently bonded trialkoxyorganosilane to provide a functional group on the surface of the coated nanoparticle for further functionalization. The second step adds the amine functionalized silane.

An exemplary trialkoxyorganosilane suitable for coating the nanoparticle for the core of the amine functionalized nanoparticle includes 3-glycidyloxypropyl) trimethoxysilane (also referred to as glymo silane). Additional trialkoxyorganosilanes can include epoxy functional silanes, hydroxylic hydrophilic silane, hydroxyl functional silanes, and thiol functional silanes. Exemplary epoxy functional silanes that can be used as the trialkoxyorganosilane suitable for coating the nanoparticle, include for example (3-glycidyloxypropyl) triethoxysilane (CAS 2602-34-8), 5,6-epoxyhexyltriethoxysilane (CAS 86138-01-4), 2-(3,4-epoxycyclohexyl)ethyltriethoxysilane (CAS 10217-34-2), and 2-(3,4-epoxycyclohexyl)ethyltrimethoxysilane (CAS 338-04-3). Exemplary hydroxylic hydrophilic silanes that can be used as the trialkoxyorganosilane suitable for coating the nanoparticle, include for example hydroxymethyltriethoxysilane (CAS 162781-73-9), 3-[bis(2-hydroxyethyl)amino]propyl-triethoxysilane (CAS 7538-44-5), [hydroxy(polyethyleneoxy)propyl]triethoxysilane, and N-(3-triethoxysilylpropyl)gluconamide (CAS 104275-58-3). Exemplary hydroxyl functional silanes that can be used as the trialkoxyorganosilane suitable for coating the nanoparticle, include for example hydroxymethyltriethoxysilane (CAS 162781-73-9), N(-hydroxyethyl)-N-methylaminopropyltrimethoxysilane (CAS 330457-46-0), and N-(3-triethoxysilylpropyl) gluconamide (CAS 104275-58-3). The hydroxyl functional silanes can include 1 or more hydroxyl groups. Exemplary thiol functional silanes that can be used as the trialkoxyorganosilane suitable for coating the nanoparticle, include for example 3-mercaptopropyltrimethoxysilane (CAS 4420-74-0), 3-mercaptopropyltriethoxysilane (CAS 14814-09-6), 11-mercaptoundecyltrimethoxysilane (CAS 877593-17-4), (mercaptomethyl)methyldiethoxysilane (CAS 55161-63-2), 3-mercaptopropylmethyldimethoxysilane (CAS 31001-77-1), etc.

Suitable amine-functionalized silanes for providing the amine functionalized group on the surface of the nanoparticle include the formula I as shown:

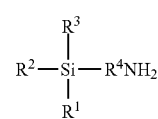

wherein:
$R^1$, $R^2$, and $R^3$ are independently -OMCH$_3$, —OH, —CH$_3$, or —Cl and wherein M is absent, $(CH_2)_m$—, or —$(CH_2Y)_n$—, wherein m is an integer from 1 to 5, n is an integer from 1 to 5, wherein Y is O, N, or S; and
$R^4$ is —CH$_2$, or a substituted or an unsubstituted, linear or branched C2-C20 alkyl group, or —(Ar)—.

Additional suitable amine-functionalized silanes for providing the amine functionalized group on the surface of the nanoparticle include the formula II as shown

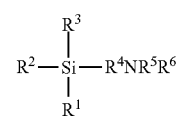

wherein:
$R^1$, $R^2$, and $R^3$ are independently -OMCH$_3$, —OH, —CH$_3$, or —Cl and wherein M is absent, $(CH_2)_m$—, or —$(CH_2Y)_n$—, wherein m is an integer from 1 to 5, n is an integer from 1 to 5, wherein Y is O, N, or S; and
$R^4$ is —CH$_2$, or a substituted or an unsubstituted, linear or branched C2-C20 alkyl group, or —(Ar)—;
$R^5$ is absent or H; and
$R^6$ is —CH$_3$, a substituted or an unsubstituted, linear or branched C2-C20 alkyl group or a primary, secondary, tertiary or quaternary alkyl amine, —(Ar)—, =(CNH$_2$NH$_2$), —((CH$_2$)$_o$NH$_2$), —((CH$_2$)$_o$NHCH$_3$), —((CH$_2$)$_o$NH(CH$_2$)$_p$NH$_2$), —((CH$_2$)$_o$NH(CH$_2$)$_p$Ar), wherein o and p are independently integers from 1 to 15.

In a preferred embodiment the amine-functionalized silane is (3-aminopropyl) trimethoxysilane as shown in the following formula:

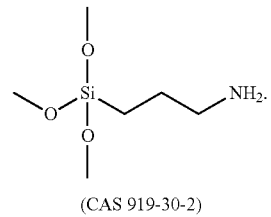

(CAS 919-30-2)

In embodiments the amine-functionalized silanes can have 0, 1, 2, or 3 alkyl oxy groups attached to the silica, such that $R^1$, $R^2$, and $R^3$ are independently —OCH$_3$, —OH, —CH$_3$, or —Cl Exemplary amine-functionalized silanes having 3, 2, 1, or 0 alkyl oxy groups attached to the silica are shown here respectively as (3-aminopropyl) trimethoxysilane (CAS 919-30-2), (3-Aminopropyl)methyldimethoxysilane (CAS 3663-44-3), (3-aminopropyl)dimethylmethoxysilane (CAS 31024-26-7), and 3-aminopropylsilanetriol (CAS 58160-99-9):

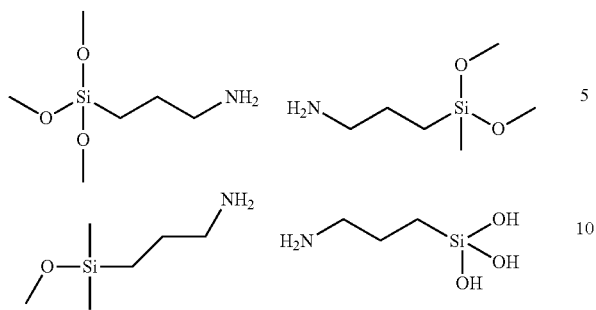

An additional amine-functionalized silanes having 3, 2, 1, or 0 alkyl oxy groups attached to the silica includes (3-aminopropyl)methyldiethoxysilane (CAS 3179-76-8).

In embodiments the amine-functionalized silanes can have 0, 1, 2, or 3 alkyl oxy groups attached to the silica, wherein the alkyl oxy groups have different number of carbons and heteroatoms, such that $R^1$, $R^2$, and $R^3$ are independently -OMCH$_3$, —OH, —CH$_3$, or —Cl and wherein M is absent, —(CH$_2$)$_m$, or —(CH$_{2m}$Y)$_n$, wherein m is an integer from 1 to 5, n is an integer from 1 to 5, wherein Y is O, N, or S. Exemplary amine-functionalized silanes shown with 3 alkyl oxy groups attached to the silica and different number of carbons and heteroatoms are shown here respectively as (3-aminopropyl) trimethoxysilane (CAS 919-30-2), 3-triethoxysilylpropan-1-amine (CAS 919-30-2), and 3-[tris[2-(2-methoxyethoxy)ethoxy]silyl]propan-1-amine (CAS 87994-64-7).

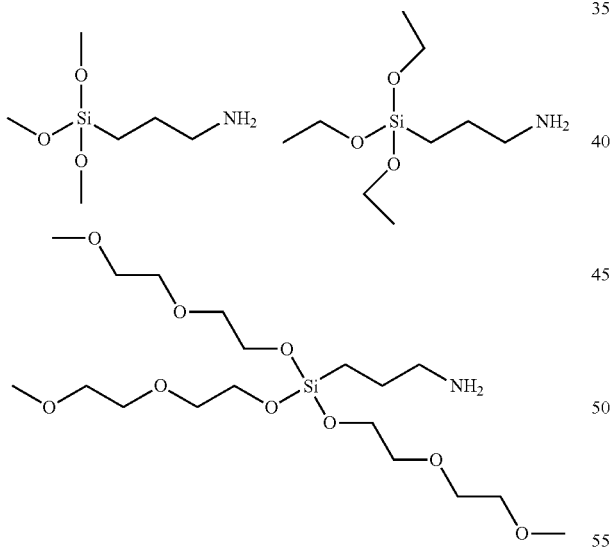

In embodiments the amine-functionalized silanes can have varying chain lengths between the amine group and the silica atom, such that $R^4$ is —CH$_2$, or a substituted or an unsubstituted, linear or branched C2-C20, C2-C15, or C2-C11 alkyl group. Exemplary amine-functionalized silanes having varying chain lengths between the amine group and the silica atom are shown here respectively as (3-aminopropyl) trimethoxysilane (CAS 919-30-2), 4-triethoxysilylbutan-1-amine (CAS 3069-30-5), and 2,2-dimethyl-4-trimethoxysilylbutan-1-amine (CAS 157923-74-5).

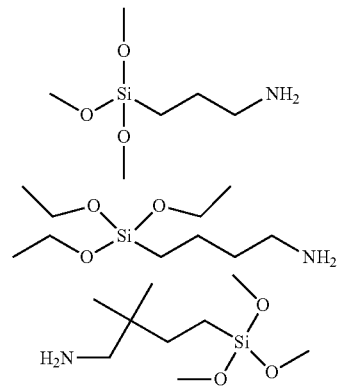

In embodiments the amine-functionalized silanes can have varying chain lengths and spacers between the amine group and the silica atom, such that $R^5$ is absent or H; and $R^6$ is —CH$_3$, a substituted or an unsubstituted, linear or branched C2-C20, C2-C15, or C2-C10 alkyl group, a primary, secondary, tertiary or quaternary alkyl amine, —(Ar)—, —((CH$_2$)$_o$NH$_2$), —((CH$_2$)$_o$NHCH$_3$), —((CH$_2$)$_o$NH(CH$_2$)$_p$NH$_2$), —((CH$_2$)$_o$NH(CH$_2$)$_p$Ar), wherein o and p are independently integers from 1 to 15, 1 to 10, or 1 to 5. Exemplary amine-functionalized silanes having varying chain lengths and space groups between the amine group and the silica atom are shown here respectively as 3-(3-trimethoxysilylpropoxy) aniline (CAS 71550-66-8) and N'-benzyl-N-(3-trimethoxysilylpropyl) ethane-1,2-diamine (CAS 62604-61-9).

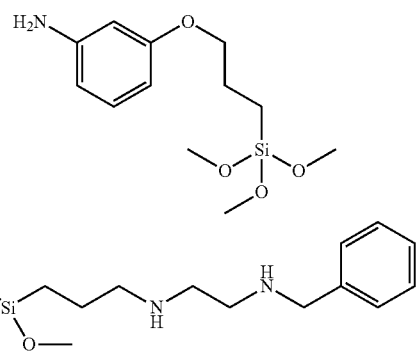

In embodiments the amine-functionalized silanes can have multiple amines on the silane molecule, such that $R^5$ is absent or H; and $R^6$ is —CH$_3$, a substituted or an unsubstituted, linear or branched C2-C20 alkyl group, a primary, secondary, tertiary or quaternary alkyl amine, —(Ar)—, =(CNH$_2$NH$_2$), —((CH$_2$)$_o$NH$_2$), —((CH$_2$)$_o$NHCH$_3$), —((CH$_2$)$_o$NH(CH$_2$)$_p$NH$_2$), —((CH$_2$)$_o$NH(CH$_2$)$_p$Ar), wherein o and p are independently integers from 1 to 15. Exemplary amine-functionalized silanes having multiple amines on the silane molecules are shown here respectively as 2-(3-trimethoxysilylpropyl) guanidine (CAS 128310-21-4), N'-[2-(3-trimethoxysilylpropylamino)ethyl]ethane-1,2-diamine (CAS 35141-30-1), and N'-[3-[dimethoxy(methyl)silyl]propyl]ethane-1,2-diamine (CAS 3069-29-2):

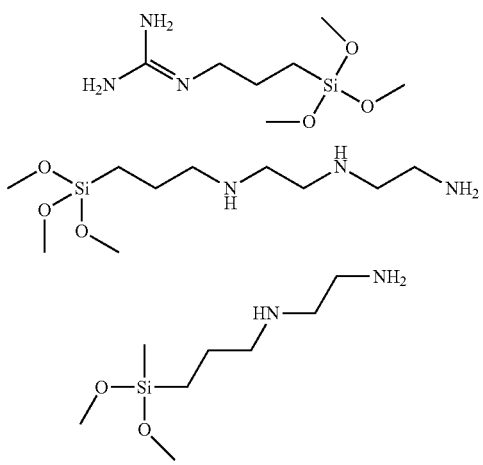

In embodiments the amine-functionalized silanes can have primary, secondary, tertiary, or quaternary amines on the silane molecule, such that $R^5$ is absent or H; and $R^6$ is —$CH_3$, a substituted or an unsubstituted, linear or branched C2-C20 alkyl group or primary, secondary, tertiary or quaternary alkyl amine, —(Ar)—, =($CNH_2NH_2$), —(($CH_2$)$_o$$NH_2$), —(($CH_2$)$_o$$NHCH_3$), —(($CH_2$)$_o$$NH(CH_2)_p$$NH_2$), —(($CH_2$)$_o$$NH(CH_2)_p$Ar), wherein o and p are independently integers from 1 to 15, 1 to 10, or 1 to 5. Exemplary primary, secondary, tertiary, or quaternary amines on the silane molecules are shown here respectively as (3-aminopropyl) trimethoxysilane (CAS 919-30-2), trimethyl(3-trimethoxysilylpropyl)azanium; chloride (CAS 35141-36-7), N-methyl-3-trimethoxysilylpropan-1-amine (CAS 3069-25-8), and N,N-diethyl-3-trimethoxysilylpropan-1-amine (CAS 41051-80-3).

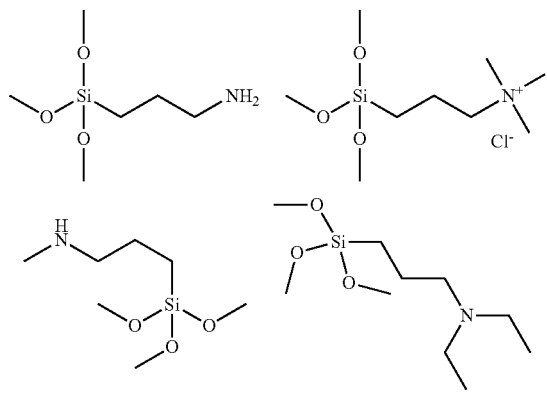

In some embodiments, the amine functionalized group is provided by an amine-functionalized silane according to formula I or II,

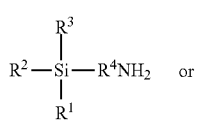
(I)

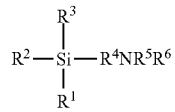
(II)

wherein:
$R^1$, $R^2$, and $R^3$ are independently -$OMCH_3$, —OH, —$CH_3$, or —Cl and wherein M is absent, ($CH_2$)$_m$—, or —($CH_2Y$)$_n$—, wherein m is an integer from 1 to 5, or 1 to 2, n is an integer from 1 to 5, wherein Y is O, N, or S;

$R^4$ is —$CH_2$, or a substituted or an unsubstituted, linear or branched C2-C20, C2-C15, or C2-C11 alkyl group, or —(Ar)—;

$R^5$ is absent or H; and $R^6$ is —$CH_3$, a substituted or an unsubstituted, linear or branched C2-C20 alkyl group or a primary, secondary, tertiary or quaternary alkyl amine, —(Ar)—, =($CNH_2NH_2$), —(($CH_2$)$_o$$NH_2$), —(($CH_2$)$_o$$NHCH_3$), —(($CH_2$)$_o$$NH(CH_2)_p$$NH_2$), —(($CH_2$)$_o$$NH(CH_2)_p$Ar), wherein o and p are independently integers from 1 to 15, 1 to 10, or 1 to 5.

In some embodiments, the ratio (based on mass) of the trialkoxyorganosilane (e.g. (3-glycidylkoxypropyl) trimethoxysilane) to the amine-functionalized silane on the surface of the nanoparticles is at least about 1:1. In further embodiments the molar ratio of the trialkoxyorganosilane (e.g. (3-glycidylkoxypropyl) trimethoxysilane) to the amine-functionalized silane is from about 100:1 to about 1:100, preferably about 1:1 to about 100:1, about 1:1 to about 20:1, about 1:1 to about 10:1, or about 1:1 to about 5:1.

In some embodiments, the ratio (based on mass) of the nanoparticle coated with the trialkoxyorganosilane to the amine-functionalized silane on the surface of the coated nanoparticle is at least about 1:1. In further embodiments the mass ratio of the nanoparticle coated with the trialkoxyorganosilane to the amine-functionalized silane on the surface of the coated nanoparticle is from about 1:100 to about 100:1, preferably from about 1:1 to about 100:1, 1:1 to about 40:1, or 1:1 to about 15:1.

In an embodiment the nanoparticle coated with the trialkoxyorganosilane and thereafter functionalized with the amine-functionalized silane on the surface of the coated nanoparticle can have varying extent of coating. For example, in embodiments the nanoparticle is at least partially coated with the trialkoxyorganosilane, and preferably substantially or fully coated with the trialkoxyorganosilane. As one skilled in the art will ascertain, the extent of the coating of the nanoparticle with the trialkoxyorganosilane will then determine the extent of functionalization of the surface of the nanoparticle with the amine-functionalized silane as it covalently bonds to the trialkoxyorganosilane.

Additional description of exemplary functionalized, i.e. surface-modified, nanoparticles and methods of making are described in U.S. patent Ser. No. 18/300,625, which is incorporated herein in its entirety.

The total amount of functionalized nanoparticle included in the concentrate composition is about 1 wt % to 80 wt %, or about 10 wt % to 80 wt %, or about 20 wt % to 80 wt %, or about 20 wt % to 60 wt % based on the total weight of a concentrate composition.

Foaming Surfactants

The gas lift flow improving composition comprise at least one amphoteric, anionic and/or nonionic foaming surfactant.

The surfactants in combination with the nanoparticles increases foaming or lower the density of the treated fluids to improve gas lift and therefore hydrocarbon yields, such as crude oil, from subterranean formations, increase the rate of hydrocarbon recovery or both, by lowering a subterranean interfacial tension.

In some embodiments the composition has a ratio on an actives basis (ppm) of functionalized nanoparticle to surfactant of at least about 1:1. In other embodiments, the composition has a ratio of functionalized nanoparticle to surfactant of at least about 1:1 to about 1:100, or about 1:1 to about 1:10, or about 1:1 to about 1:5.

In some embodiments the surfactants include an amphoteric, anionic and/or nonionic surfactant. In some embodiments the surfactants are a blend of two or more amphoteric surfactants. The amphoteric surfactant, also termed a zwitterionic surfactant, includes at least one internal anionic moiety, at least one internal cationic moiety, and has a net internal charge of zero. In some embodiments, the amphoteric surfactant comprises, consists essentially of, or consists of a single internal cation, a single internal anion, and a hydrophobic moiety selected from linear, branched, alicyclic, aryl, and alkaryl groups having 6 to 50 carbon atoms. In some embodiments, the amphoteric surfactant includes at least one internal cationic moiety comprising ammonium or phosphonium; and at least one internal anionic moiety comprising sulfonate, sulfate, oxide, carboxylate, phosphate, phosphite, or phosphonate. In some embodiments, the amphoteric surfactant includes at least one internal cationic moiety comprising ammonium or phosphonium; and at least one internal anionic moiety comprising sulfonate. In some embodiments, the amphoteric surfactant includes at least one internal hydroxyl group.

Examples of useful amphoteric surfactants include those having a hydrophobic moiety selected from linear, branched, alicyclic, aiyl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms. One useful class of amphoteric surfactants is amino acids having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms, including for example N-dodecyl-N,N-dimethyl glycine. Another class of useful amphoteric surfactants is trialkylamine oxides having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms. Representative examples of such amphoteric surfactants include N,N-dimethyl-N-dodecyl amine oxide, N,N-dimethyl-N-hexadecyl amine oxide, N,N-dimethyl-N-octadecyl amine oxide, and N,N-dimethyl-N—(Z-9-octadecenyl)-N-amine oxide.

Another class of useful amphoteric surfactants is betaines, which include one internal carboxylate moiety, one internal ammonium moiety, and a hydrophobic moiety selected from linear, branched, alicyclic, alkyl, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms. Representative but nonlimiting examples of betaines include lauroylamide propylbetaine, 2-(dodecyldimethylammonio)acetate (CAS No. 683-10-3), cocamidopropyl betaine (2-[3-(dodecanoylamino) propyl-dimethy lazaniumyl] acetate), dodecanamidopropyl betaine ({2-[3-(dodecanoylamino)propyl]triazan-2-ium-2-yl)acetate), cetyl betaine (2-[hexadecyl(dimethyl)azaniumyl]acetate), oleamidopropyl betaine ((Z)-(carboxymethyl)dimethyl-3-((1-oxo-9-octadecenyl)amino)propylammonium hydroxide), caprylamidopropyl betaine (2-[dimethyl-[3-(octanoylamino)propyl]azaniumyl] acetate), and C10-16-alkyl (2-hydroxy-3-sulfopropyl)dimethyl (Mackam™ LHS supplied by Solvay.)

Another class of useful amphoteric surfactants is sultaines, which include one internal sulfonate moiety and one internal ammonium moiety (also referred to as sulfobetaines). Examples of sultaines are lauryl sulfobetaine (3-(dodecyldimethylammonio)propane-1-sulfonate), caprylyl sulfobetaine (3-[decyl(dimethyl)azaniumyl]propane-1-sulfonate), myristyl sulfobetaine (3-[dimethyl(tetradecyl) azaniumyl]propane-1-sulfonate), Sulfobetaine 10 (CAS No. 15163-36-7), Sulfobetaine 3-14 (N-tetradecyl-N,N-dimethyl-3-ammonio-1-propanesulfonate), Sulfobetaine 3-10 (N-decyl-N,N-dimethyl-3-ammonio-1-propanesulfonate); alkylether hydroxypropyl sultaines and alkyldimethylhydroxysultaines such as lauryl hydroxy sultaine (3-[dodecyl (dimethyl) ammonio]-2-hydroxypropane-1-sulfonate; 351.55 g/mol; CAS No. 13197-76-7), myristamidopropyl hydroxysultaine (2-hydroxy-N,N-dimethyl-N-(3-((1-oxotetradecyl)amino)propyl)-3-sulfo-, inner salt); cocoamidopropyl hydroxysultaine, and the like. Mixtures of such surfactants having various carbon chain lengths are obtained in some embodiments; for example, 3-((C10-C16)-alkyldimethylammonio)-2-hydroxypropanesulfonate (CAS No. 72869-77-3) is a mixture of alkylated moieties having an average of 10 to 16 carbons.

Another class of useful amphoteric surfactants is phosphate functional amphoteric surfactants, which include one internal phosphate moiety, one internal ammonium moiety, optionally a carboxylate moiety, and either one or two hydrophobic moieties, wherein each hydrophobic moiety is selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms. Representative but nonlimiting examples of phosphate functional amphoteric surfactants include phosphatidylserines, phosphatidylethanolamines, phosphatidylcholines such as 1-oleoyl-2-palmitoyl-phosphatidylcholine, and sphingomyelins.

In some embodiments the nonionic surfactants are one or more surfactants selected from the group comprising, consisting essentially of, or consisting of alkoxylated alcohols, alkoxylated alkyl phenols, or ethylene oxide/propylene oxide copolymers. In other embodiments the nonionic surfactants are alkoxylated alcohols, alkoxylated alkyl phenols, or ethylene oxide/propylene oxide copolymers having an hydrophilic-lipophilic balance (HLB) greater than about 10, for example about 10 to 20, or about 10 to 18, or about 10 to 16, or about 10 to 14, or about 11 to 20, or about 11 to 18, or about 11 to 17, or about 11 to 16, or about 11 to 15, or about 11 to 14, or about 11 to 13, and mixtures of these compounds.

In some embodiments, the nonionic surfactants are ethoxylated C6-C14 or C10-C14 alcohols and alkyl phenols.

In some embodiments the nonionic surfactants are polyoxyethylene alkyl ether, polyoxyethylene alkylphenol ether, ethylene oxide-propylene oxide block copolymers, alkyl glucoside, polyoxyethylene fatty acid ester, sucrose fatty acid ester, sorbitan fatty acid ester, polyoxyethylene sorbitan fatty acid ester, and fatty acid alkanolamide. In some embodiments the nonionic surfactant is ethoxylated castor oil, dimethyl-lauryl-amine, 00-16 alkyl dimethylamines, alkoxylated ethylenediamine, ethoxylated alcohol, ethoxylated hexanol or mixtures thereof.

In some embodiments the surfactants are a blend of amphoteric surfactants, anionic surfactants, nonionic surfactants and mixtures thereof. In some embodiments, the anionic surfactants are salts (including, for example, sodium, potassium, ammonium, and substituted ammonium salts such as mono-, di-, and triethanolamine salts) of the anionic sulfate, sulfonate, carboxylate and sarcosinate surfactants. In other embodiments, the anionic surfactants are isethionates such as the acyl isethionates, N-acyl taurates, fatty acid amides of methyl tauride, alkyl succinates, sulfoacetates, and sulfosuccinates, monoesters of sulfosuccinate (e.g., saturated and unsaturated C12-C18 monoesters), diesters of sulfosuccinate (e.g., saturated and unsaturated C6-C14 diesters), and N-acyl sarcosinates.

In some embodiments the anionic surfactant is a sulfosuccinate. In some embodiments the sulfosuccinate are C8-C22 sulfosuccinates. In still other embodiments the anionic surfactant is sodium dodecylbenzene sulfonate, nacconol 90G, dioctyl sodium sulfosuccinate, sodium-toluene sulfonate, sodium benzene sulfonate, linear alkylbenzene sulfonates (LAS) or sodium dodecyl sulfate (SDS).

In an embodiment, the foaming amphoteric surfactants comprises an alkyl betaines, preferably lauroylamide propylbetaine or cocamidopropyl betaine. In other embodiments, the foaming surfactants comprise a sulfonate moiety, such as alkyldiphenyloxide disulfonate.

The total amount of surfactant included in the concentrate composition is about 0.1 wt % to 70 wt %, or about 1 wt % to 60 wt %, or about 10 wt % to 60 wt %, or about 10 wt % to 50 wt % based on the total weight of a concentrate composition.

Solvents

The compositions can include a solvent (which may be referred to as a co-solvent or a mutual solvent) to provide an aqueous medium. Solvents employed in the compositions (concentrates, injectates, and/or fracturing fluids) comprise, consist essentially of, or consist of coupling agents and water sources. In embodiments the solvent is water and additional coupling agent.

Suitable solvents comprise, consist essentially of, or consist of linear, branched, or cyclic aliphatic alcohols having 1 to 6 carbon atoms, diols having 1 to 6 carbon atoms, alkyl ethers of alkylene glycols wherein the alkyl moiety has 1 to 6 carbon atoms (e.g., ethylene glycol mono-n-butyl ether), polyalkylene glycols, and mixtures thereof. Also useful as solvents are glycol and glycerol-based acetals and ketals, such as those formed from the condensation of e.g., glycerol with formaldehyde, acetone, or oxocarboxylic acids, semialdehydes, and esters thereof such as levulinic acid or an alkyl levulinate. In some embodiments, the solvent comprises, consists essentially of, or consists of methanol, ethanol, propanol, butanol, glycerol, ethylene glycol, ethylene glycol monoalkyl ether wherein the ether moiety comprises 1 to 6 carbon atoms, or a combination of two or more thereof. In some embodiments, the solvent is ethylene glycol and diethylene glycol.

The total amount of solvent included in the concentrate composition is about 0.01 wt % to 30 wt %, about 0.1 wt % to 30 wt %, about 1 wt % to 30 wt %, about 5 wt % to 30 wt %, or about 10 wt % to 30 wt % based on the total weight of a concentrate composition.

The solvent is generally not included in the list of "actives" or active ingredients, but is present in the concentrate to promote and increase storage stability of the concentrate as well as facilitate stability of the composition during dilution of the concentrate to form an injectate. Additionally, in some embodiments the solvent further suppress the freezing point of the concentrate which is advantageous for winter storage and transportation purposes. Finally, in some embodiments the solvent reduce the viscosity of a concentrate, increasing the pumpability and pourability of the concentrate over a range of field use temperatures.

The composition comprising, consisting essentially of, or consisting of combination of the functionalized nanoparticles, solvent and/or surfactants can be variously formulated. In some embodiments, the composition is an injectate. An injectate is any aqueous composition that is injected into a subterranean formation to bring about a gas lift, increase in yield or rate of recovery of a hydrocarbon from the subterranean formation. In some embodiments, the composition is a concentrate. In some embodiments the composition is a fracturing fluid or drilling fluid.

In some embodiments, the composition comprises, consists essentially of, or consists of functionalized nanoparticles, a surfactant comprising an amphoteric surfactant and a solvent selected from a water source, mutual solvents or mixture thereof. In further embodiments, the composition comprises, consists essentially of, or consists of functionalized nanoparticles, a surfactant comprising amphoteric surfactants, nonionic surfactants, anionic surfactants, or mixtures thereof, and a solvent selected from a water source, mutual solvents or mixture thereof.

In some embodiments, the disclosed compositions are made using produced water and are suitable for injection into a subterranean formation, where the fluids remain stable and do not cause precipitation, separation, or another behavior attributable to instability, while flowing underground. This in turn results improve recovery of hydrocarbons from the subterranean formations.

The disclosed compositions may include additional components or additives, such oxidizing agents, water-soluble enzymes, clay stabilizers, corrosion inhibitors, scale inhibitors, viscosifying agents, flow back aids, friction reducers, proppants, biocides, buffers, or in various combinations depending on the chemical and physical attributes of the particular subterranean formation. In some embodiments the additive includes oil field additives conventionally used in hydraulic fracturing or post-primary fracturing of subterranean hydrocarbon-containing formations. In some embodiments, the additives are added to the concentrates, and the resulting concentrates are stable, or even storage stable. In other embodiments, the additives are not added to the concentrate, but rather are added to the subterranean formation contemporaneously with dilution of the concentrate to form an injectate, or are added to the injectate after the injectate is formed.

In some embodiments, the additional components or additives comprises a corrosion inhibitor, scale inhibitor, or combinations thereof.

In some embodiments, an injectate is formed by combining the gas lift improver composition comprising the functionalized nanoparticles, one or more foaming surfactants, solvent, and optional additional components or additives with a water source. In further embodiments, an injectate is formed by combining a water source and gas lift flow improving components comprising functionalized nanoparticles having an average particle size from about 1 nm to about 1000 nm and a foaming surfactant comprising an amphoteric, anionic and/or nonionic surfactant. In some embodiments the water source is water with one or more solids dissolved therein, or with total dissolved solids less than about 300,000 mg/L. The methods descried herein are suitable for use in water with high total dissolved solids.

Beneficially, the injectate compositions are suitable for use to increase the gas lift of hydrocarbon from a subterranean formation, rate of hydrocarbon recovery from a subterranean formation, total yield of hydrocarbon recovered from a subterranean formation, or combinations thereof.

Methods of Use

The injectates and gas lift flow improving compositions described herein can be used to increase the gas lift of hydrocarbon from a subterranean formation or well (i.e. production), rate of hydrocarbon recovery from a subterranean formation or well, total yield of hydrocarbon recovered from a subterranean formation or well, or combinations thereof. Without being limited to a particular mechanism of action, in embodiment, the increase the gas lift of hydrocarbon from a subterranean formation or well (i.e. production), rate of hydrocarbon recovery from a subterranean formation or well, total yield of hydrocarbon recovered from a subterranean formation or well, or combinations thereof as a result of the injectate or gas lift flow improving composition lowering the fluid density within a subterranean formation or well. The methods provide the increased liquid unloading, leading to a production increase from the subterranean formation or well.

The methods of using the injectates and gas lift flow improving compositions provide benefits of using chemical solution with or without mechanical gas lift, including higher production at the same gas lift injection rate or a similar production at a lower gas injection rate. The methods of using the injectates and gas lift flow improving compositions also beneficially overcome various drawbacks of gas lift without chemicals, including ineffective for low reservoir pressure despite high gas injection flow rates, limits on gas injection rate for stable casing and tubing fluid flow, and/or unreliable backpressure systems and low max operating pressure.

Disclosed herein are methods of treating a subterranean formation or well for improving gas lift flow, comprising, consisting essentially of, or consisting of, introducing into the subterranean formation or well an injectate or the gas lift flow improving compositions described herein. In some embodiments, the introduction is by injecting the fluid into a subterranean formation or well to be treated. In embodiments, the fluid is introduced into the subterranean formation or well with a drilling fluid, a fracturing fluid, or an injectate.

In some embodiments, the injectate or composition breaks up deposits present in the subterranean formation or well, alters the wettability of the subterranean formation or well to water wet, decreases fluid density within the subterranean formation or well, and increases the relative permeability of the subterranean formation or well to hydrocarbons or combinations thereof. In some embodiments, the injectate or composition break up of deposits, the alteration of the wettability of the subterranean formation or well to water wet, decreases fluid density within the subterranean formation or well, and/or the increase of the relative permeability of the subterranean formation or well for hydrocarbons results in the increased flow of hydrocarbons from the subterranean formation or well. In some embodiments, the injectate or compositions can be used to lower and improve relative density of the fluids to improve gas lift flow from the subterranean formation or well.

In some embodiments the methods are particularly suitable for subterranean formation or well comprising a low permeability formation, such as permeability formation of less than 0.1 mD, or less than 0.01 mD. In some embodiments, the low permeability formation can include wells with loading that occurs when water and condensate enter the bottom of the well.

The injectate or compositions described herein can also be used to increase the production of hydrocarbons from a subterranean formation or well that has already been subject to prior subterranean formation stimulation such as hydraulic fracturing or matrix stimulation. In some embodiments, the injectate or compositions can be used to enhanced oil recovery stimulation where compositions are pumped with water into injection well(s) and the oil is recovered from production well(s). In some embodiments, the injectate or compositions can be used as additives to stimulation fluids (such as hydraulic fracturing fluids). In some embodiments, the injectate or compositions can be injected with other treatment fluids into the formation prior to pumping the stimulation fluids.

A concentration of the functionalized nanoparticles (or nanoparticles in a composition) can be between about 1 ppm and about 5,000 ppm, such as 50 ppm and about 5,000 ppm, between about 100 ppm and about 1,000 ppm, between about 100 ppm and about 500 ppm, or between about 100 ppm and about 300 ppm, or between about 100 ppm and about 200 ppm. However, the disclosure is not so limited and the concentration of the nanoparticles in the composition may be lower or higher depending on a particular application.

A concentration of the foaming surfactant(s) can be between about 1 ppm and about 500,000 ppm, such as 50 ppm and about 5,000 ppm, between about 100 ppm and about 1,000 ppm, between about 100 ppm and about 500 ppm, or between about 100 ppm and about 300 ppm, or between about 100 ppm and about 200 ppm. However, the disclosure is not so limited and the concentration of the nanoparticles in the composition may be lower or higher depending on a particular application.

In some embodiments the composition has a ratio on an actives basis (ppm) of functionalized nanoparticle to surfactant of at least about 1:1. In other embodiments, the composition has a ratio of functionalized nanoparticle to surfactant of at least about 1:1 to about 1:100, or about 1:1 to about 1:10, or about 1:1 to about 1:5.

A pH of the compositions may be between about 3.0 and about 12.0. In some embodiments, the compositions may exhibit a basic pH, such as a pH greater than about 9.0, greater than about 10.0, or even greater than about 11.0. In other embodiments, the compositions may exhibit a pH between about 7.0 and about 9.0, such as about 8.0. In other embodiments, the compositions may exhibit an acidic pH, such as a pH between about 3.0 and about 7.0, such as between about 3.0 and about 5.0, or between about 5.0 and about 7.0. In some embodiments, the pH of the compositions may be about 3.0. However, the disclosure is not so limited, and the compositions may exhibit a different pH.

In some embodiments, the injectate or composition is disposed within the subterranean formation or well for at least 7 to 90 days, where it does not separate, precipitate or coagulate.

After subterranean injection, hydrocarbon fluids contacted by the composition decrease fluid density to enhance amount and/or rate of hydrocarbon recovery from the subterranean formation or well.

In some embodiments, the introducing (e.g., injecting) of the composition is carried out after hydraulic fracturing of the subterranean formation. In some embodiments, the composition is injected into a subterranean formation wherein no hydraulic fracturing has been carried out. In other embodiments, injecting of the composition is carried out contemporaneously with hydraulic fracturing of the subterranean formation. In some embodiments the composition and methods are particularly useful in secondary and tertiary oil recovery, collectively referred to herein as enhanced oil recovery, which is any injection carried out after the fluid connection of a well is already established. In some embodiments, the composition and methods are particularly useful in obtaining hydrocarbon from tight or very tight subterranean rock formation in need of lowering the fluid density to improve gas lift flow or increase production in the subterranean formation or well.

In some embodiments, a method to enhance hydrocarbon recovery is to alter the hydrocarbon fluid density in the subterranean formation. Fluid density is measured in mass divided by volume. However, a primary outcome measured in the field is production rate from a subterranean formation or well.

The methods described herein can further be combined with high gas flaw rates to further enhance oil recovery. However, the use of the injectates and compositions described herein beneficially does not require any additional or high efficiency pumps (as required with high gas flaw rates). Instead the use of the injectates and compositions described herein reduces the amount of gas and equipment used in the field.

The disclosed compositions and methods are used to enhance hydrocarbon recovery from subterranean formations that have previously been depleted. In some embodiments, the disclosed compositions and methods are used to obtain oil from subterranean formations that are tight rock formations or very tight rock formations.

The compositions and methods are most effective in enhancing hydrocarbon recovery from subterranean formations having a water cut less than about 39% or greater than about 76%.

The compositions and methods are most effective in enhancing hydrocarbon recovery from subterranean formations having a fluid with a total dissolved solid of less than about 300,000 mg/L.

Embodiments

The present disclosure is further defined by the following numbered embodiments:

1. A gas lift flow improving composition comprising: a functionalized nanoparticle, wherein the nanoparticle has an average particle size from about 1 nm to about 1000 nm; a foaming surfactant comprising an amphoteric, anionic and/or nonionic surfactant; and wherein the composition is dispersed in an aqueous medium.
2. The composition of embodiment 1, wherein ratio of the functionalized nanoparticle to the surfactant is about 1:1 or greater on an actives (ppm) basis, or between about 1:1 to about 1:100 on an actives (ppm) basis.
3. The composition of any one of embodiments 1-2, wherein the foaming surfactant comprises an amphoteric alkyl betaine.
4. The composition of any one of embodiments 1-3, wherein the aqueous medium comprises a coupler and/or a solvent.
5. The composition of any one of embodiments 1-4, wherein the nanoparticle has an average particle size from about 1 nm to about 500 nm, or from about 1 nm to about 200 nm.
6. The composition of any one of embodiments 1-3, wherein the nanoparticles are selected from silica and metal-based nanoparticles.
7. The composition of embodiment 4, wherein the silica is selected from the group consisting of colloidal silica, nanosilica, silicate nanoparticle, polyhedral oligomeric silsesquioxane nanoparticle, and silicon dioxide nanoparticle dispersion.
8. The composition of any one of embodiments 1-5, wherein the functionalized nanoparticle is surface modified with a silane compound.
9. The composition of embodiment 8, wherein the silane compound comprising one or more of 3-glycidoxypropyltrimethoxysilane, 3-glycidoxypropylmethyldimethoxysilane, 3-glycidoxypropylmethyldiethoxysilane, 3-glycidoxypropyltriethoxysilane, 2-(3,4-epoxycyclohexyl)propyltrimethoxysilane, 2-(3,4 epoxycyclohexyl)propyltriethoxysilane, 2-(3,4-epoxycyclohexyl)ethyltrimethoxysilane, 2-(3,4-epoxycyclohexyl) ethyltriethoxysilane, 2-(3,4-epoxycyclohexyl) methyltrimethoxysilane, 2-(3,4 epoxycyclohexyl) methyltriethoxysilane, [(3-ethyl-3 oxethanyl)methoxy] propyltrimethoxysilane, or [(3-ethyl-3-oxethanyl) methoxy]propyltriethoxysilane.
10. The composition of embodiment 8, wherein the silane compound is a zwitterionic silane comprising one or more of 3-(dimethyl (3-(trimethoxysilyl) propyl)-ammonio) propane-1-sulfonate, 3-(dimethyl (3-(triethoxysilyl) propyl)-ammonio) propane-1-sulfonate, or 3-(diethyl (3-(trimethoxysilyl) propyl)-ammonio) propane-1-sulfonate.
11. The composition of any one of embodiments 1-7, wherein the functionalized nanoparticle has a core-shell nanoparticle morphology comprising a trialkoxyorganosilane coated nanoparticle core and an amine functionalized group on the surface of the nanoparticle as a shell.
12. The composition of embodiment 11, wherein the wherein the trialkoxyorganosilane is an epoxy functional silane, hydroxylic hydrophilic silane, hydroxyl functional silane, or thiol functional silane.
13. The composition of any one of embodiments 11-12, wherein the amine functionalized group is provided by an amine-functionalized silane according to formula I or II,

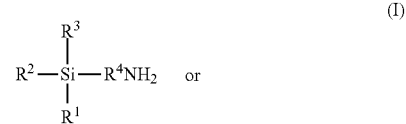

-continued

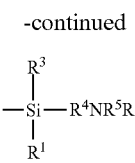
(II)

wherein: $R^1$, $R^2$, and $R^3$ are independently -OMCH$_3$, —OH, —CH$_3$, or —Cl and wherein M is absent, —(CH$_2$)$_m$—, or —(CH$_2$Y)$_n$—, wherein m is an integer from 1 to 5, n is an integer from 1 to 5, wherein Y is O, N, or S; and $R^4$ is —CH$_2$, or a substituted or an unsubstituted, linear or branched C2-C20 alkyl group, or —(Ar)—; $R^5$ is absent or H; and $R^6$ is —CH$_3$, a substituted or an unsubstituted, linear or branched C2-C20 alkyl group or a primary, secondary, tertiary or quaternary alkyl amine, —(Ar)—, =(CNH$_2$NH$_2$), —((CH$_2$),NH$_2$), —((CH$_2$)$_o$NHCH$_3$), —((CH$_2$)$_o$NH(CH$_2$)$_p$NH$_2$), —((CH$_2$)$_o$NH(CH$_2$)$_p$Ar), wherein o and p are independently integers from 1 to 15.

14. The composition of any one of embodiments 11-13, wherein the amine functionalized group is covalently bonded to the trialkoxyorganosilane coated nanoparticle.

15. The composition of any one of embodiments 11-14, wherein the molar ratio of the trialkoxyorganosilane to the amine-functionalized silane is about 1:1 to about 100:1 or about 1:1 to about 20:1, and the mass ratio of the trialkoxyorganosilane coated nanoparticle core to the amine-functionalized silane on the coated nanoparticle is about 1:1 to about 100:1 or about 1:1 to about 40:1.

16. The composition of any one of embodiments 11-15, wherein the functionalized nanoparticle is a reaction product obtained by a first step of coating a nanoparticle with a trialkoxyorganosilane and thereafter covalently bonding an amine-functionalized silane to the surface of the coated nanoparticle, wherein the reaction product has a core-shell nanoparticle morphology comprising the trialkoxyorganosilane coated nanoparticle core and the amine functionalized group on the surface of the coated nanoparticle core as a shell.

17. The composition of embodiment 16, wherein the amine functionalized group is covalently bonded to the trialkoxyorganosilane coated nanoparticle.

18. The composition of any one of embodiments 1-17, wherein the functionalized nanoparticle comprises from about 20-80 wt-% of the composition, wherein the foaming surfactant comprises from about 10-60 wt-% of the composition, and wherein the aqueous medium comprises from about 10-30 wt-% of the composition.

19. The composition of any one of embodiments 1-18, further comprising a corrosion inhibitor, scale inhibitor, or combinations thereof.

20. An injectate composition comprising: a water source and the composition of any one of embodiments 1-19, or a water source and gas lift flow improving components comprising functionalized nanoparticles having an average particle size from about 1 nm to about 1000 nm and a foaming surfactant comprising an amphoteric, anionic and/or nonionic surfactant.

21. Use of the injectate composition of embodiment 20 to increase the gas lift of hydrocarbon from a subterranean formation or well, rate of hydrocarbon recovery from a subterranean formation or well, total yield of hydrocarbon recovered from a subterranean formation or well, or combinations thereof.

22. A method of improving gas lift flow in a subterranean formation or well comprising: introducing an injectate according to embodiment 17 or a gas lift flow improving composition according to any one of embodiments 1-19 into a fluid comprising hydrocarbon or condensate in a subterranean formation or well, and lowering the fluid density to improve gas lift flow or increase production in the subterranean formation or well.

23. The method of embodiment 22, wherein the introducing step is injecting the composition into the subterranean formation or well.

24. The method of any one of embodiments 22-23, wherein the injectate or the composition is introduced into the subterranean formation or well with a drilling fluid, a fracturing fluid, or an injectate.

25. The method of any one of embodiments 22-24, wherein the fluid has a water cut less than about 39% or greater than 76%.

26. The method of any one of embodiments 22-25, wherein the fluid has a total dissolved solid of less than about 300,000 mg/L.

27. The method of any one of embodiments 22-26, wherein the subterranean formation or well comprises a low permeability formation of less than 0.1 mD, or less than 0.01 mD.

28. The method of any one of embodiments 22-27, further comprises recovering hydrocarbon from the treated subterranean formation or well.

29. The method of embodiment 28, wherein the recovered hydrocarbon comprises an oil or a condensate.

30. The method of any one of embodiments 28-29, wherein the method results in an increase in recovered hydrocarbon in comparison to a subterranean formation or well treated with an injectate or gas lift flow improving composition that is free of the functionalized nanoparticle.

EXAMPLES

Embodiments of gas lift flow improving compositions comprising functionalized nanoparticles combined with surfactants are further defined in the following non-limiting Examples. It should be understood that these Examples, while indicating one or more preferred embodiments, are given by way of illustration only and are non-limiting. From the above discussion and these Examples, one skilled in the art can ascertain the essential characteristics of the disclosure, and without departing from the spirit and scope thereof, can make various changes and modifications of the embodiments of the disclosure to adapt it to various usages and conditions. Thus, various modifications of the embodiments, in addition to those shown and described herein, will be apparent to those skilled in the art from the foregoing description. Such modifications are also intended to fall within the scope of the appended claims.

The following materials are utilized in the Examples:
Alkyl betaine (2), cocamidopropyl betaine surfactant, commercially available from ChampionX Inc.
Alkyl betaine, Lauroylamide propylbetaine surfactant, commercially available from ChampionX Inc.
Dowfax 3B2, anionic alkyldiphenyloxide disulfonate surfactant, commercially available from Dow.
Glymo-NP, functionalized nanoparticle with glymo ((3-Glycidoxypropyl). trimethoxysilane, CAS Number 2530-83-8) modification to a Colloidal Silica nanoparticle SiO$_2$—NH$_2$ NP, APTMS Functionalized GLYMO-nanosilica.

Example 1

Testing was conducted to assess if nanoparticles improve performance in foaming tests as an indicator of use as a gas lift flow improvers. Amine functionalized nanoparticles utilized in the Example were trialkoxyorganosilane coated nanoparticles coated with an amine-functionalized silane. The amine functionalized nanoparticles were used in the study in combination with an alkyl betaine surfactant composition (surfactant is the only active). The study evaluated varying concentrations in a 1000-mL jacketed graduated cylinder at designed temperature. The concentrations were from 1000 ppm of actives to 200 ppm actives at a constant temperature of 70° C. in a synthetic brine with approximately 150,000 mg/L TDS (total dissolved solids), with iron and carbonate ions removed to avoid oxidation and scale formation. The measurements were conducted using 100 mL of fluid sample was agitated with sparging gas of nitrogen at a flow rate of 1 LPM. Testing was conducted in a 20% water cut. A total 200 ppm actives was further tested as an actives concentration that did not cause over foaming in the tests.

Figure 1B:
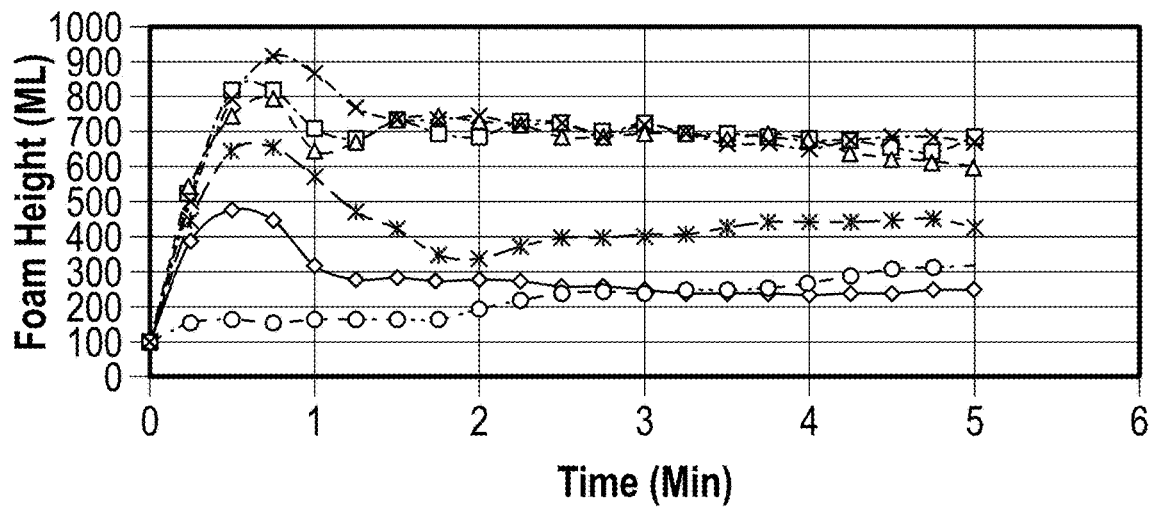
FIG. 1B shows another graph measuring foam height (ml) over time in 20% water cut fluid treated with varying ratios of nanoparticle (NP) to alkyl betaine surfactants as described in Example 1.

Foam height in mL was recorded every 15 seconds up to 5 minutes with sparging gas stopped for recording foam half-life; the time taken for the foam column reduced to its half. The tests measured foam height and these results are shown in FIGS. 1A-1B, where the nanoparticle (NP) alone did not show improvement above a blank (No additives) test point as a negative control. The combinations of NP and alkyl betaine surfactant showed improvement by increased foam height. The best performance was achieved at a 1:1 ratio of the NP to alkyl betaine surfactant (100 ppm/100 ppm).

Figure 2A:
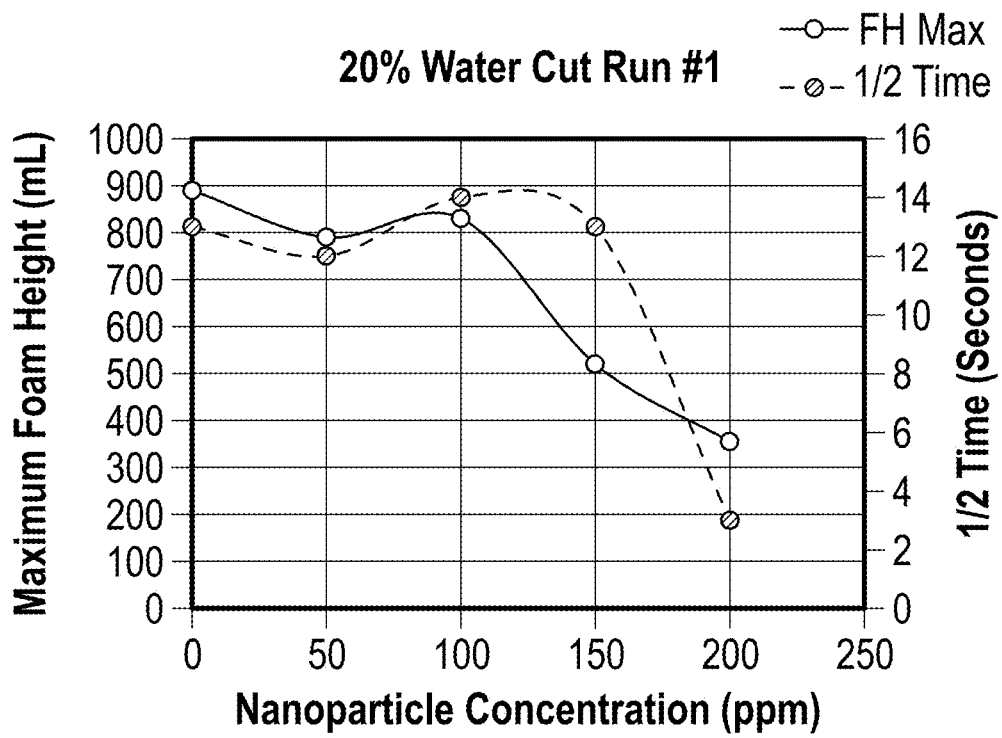
FIG. 2A shows a graph measuring the maximum foam height (ml) and the half-life of the foam at each NP concentration tested in FIG. 1A as described in Example 1.
Figure 2B:
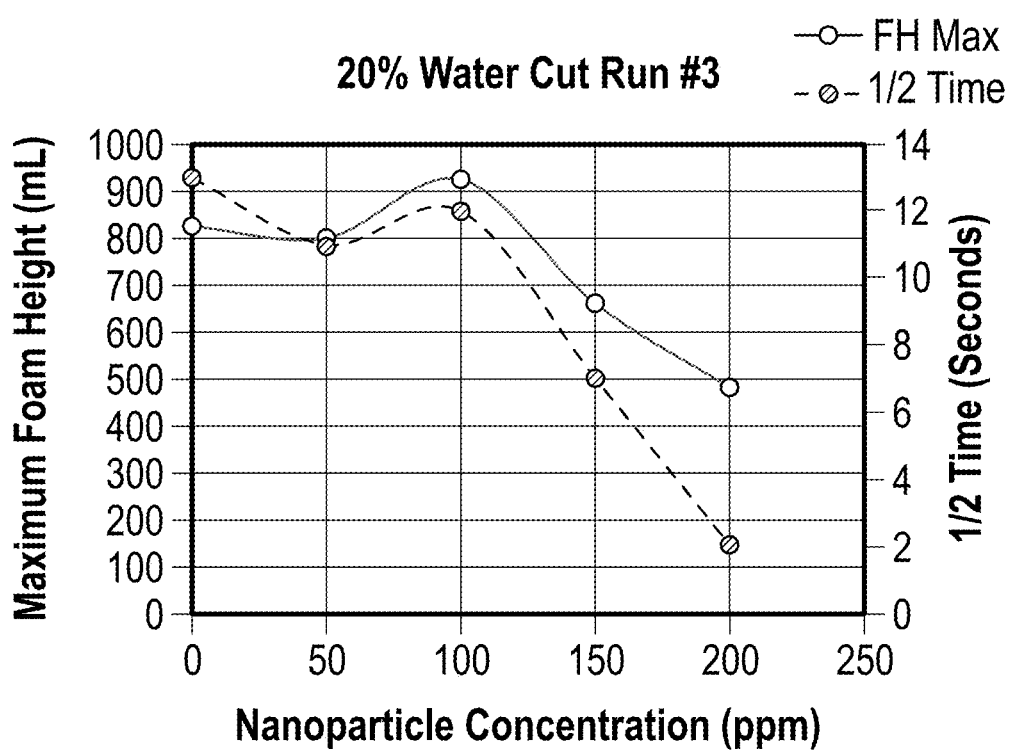
FIG. 2B shows a graph measuring the maximum foam height (ml) and the half-life of the foam at each NP concentration tested in FIG. 1B as described in Example 1.

The tests also measured the maximum foam height and half-life of the foam from FIGS. 1A-1B, which are depicted in FIGS. 2A-2B. The half-life of foam is indicative of foam stability, where the increase in half-life provides a more stable foam. The 1:1 ratio (100 ppm NP) showed the greatest maximum foam height and the longest foam half-life of the evaluated compositions, again demonstrating best performance achieved at a 1:1 ratio of the NP to alkyl betaine surfactant (100 ppm/100 ppm). The evaluate compositions providing foaming that has a maximum height and long half-life is illustrative of the compositions lowering the density of the treated fluids, wherein the quick formation (i.e. decrease in density of the fluid) and long-lasting effect is desired to provide which gas lift flow improving compositions.

Example 2

Figure 3A:
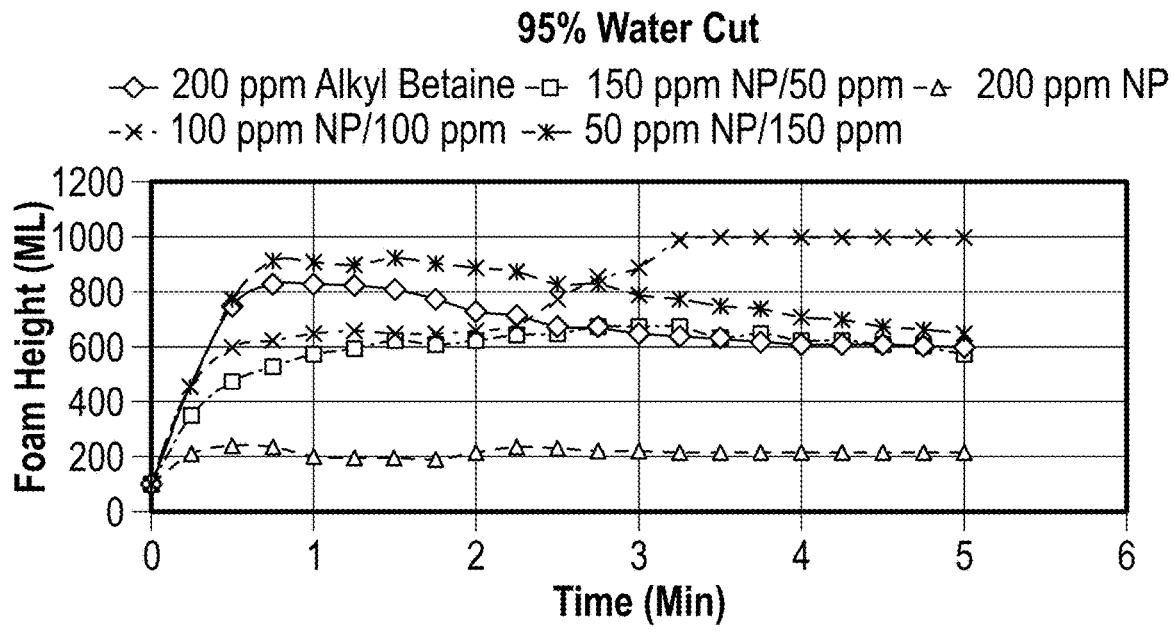
FIG. 3A shows a graph measuring foam height (ml) over time in 95% water cut fluid treated with varying ratios of nanoparticle (NP) to alkyl betaine surfactants as described in Example 2.
Figure 3B:
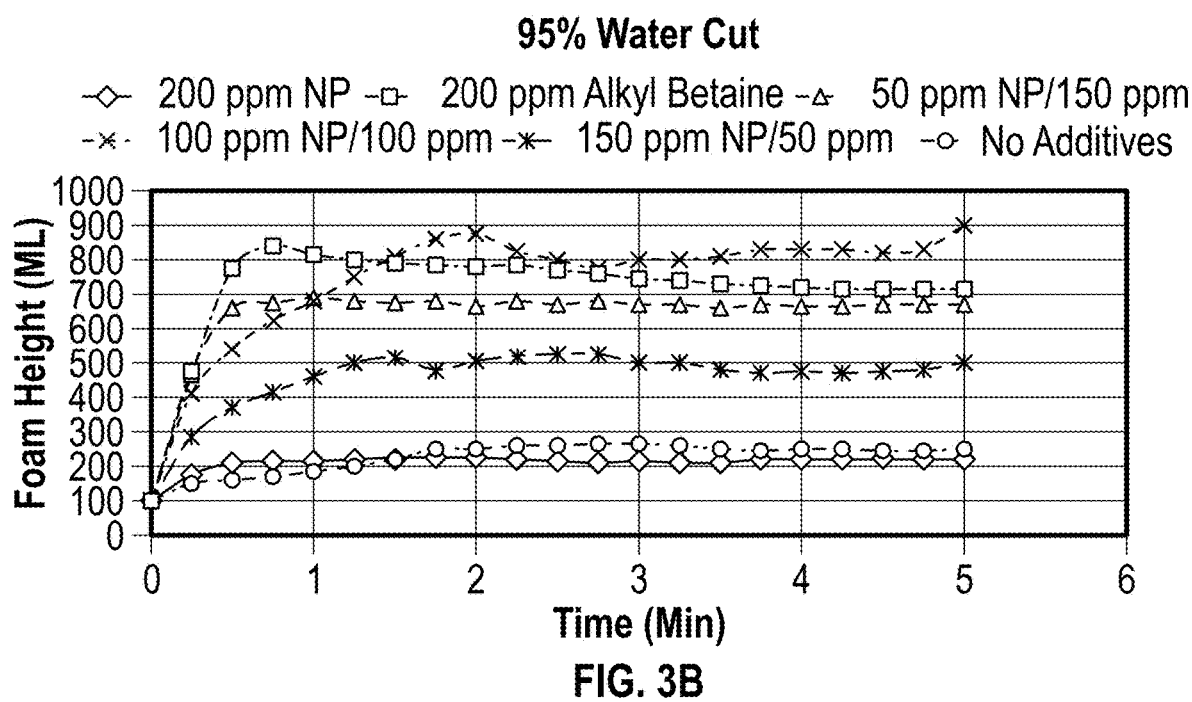
FIG. 3B shows another graph measuring foam height (ml) over time in 95% water cut fluid treated with varying ratios of nanoparticle (NP) to alkyl betaine surfactants as described in Example 2.
Figure 4A:
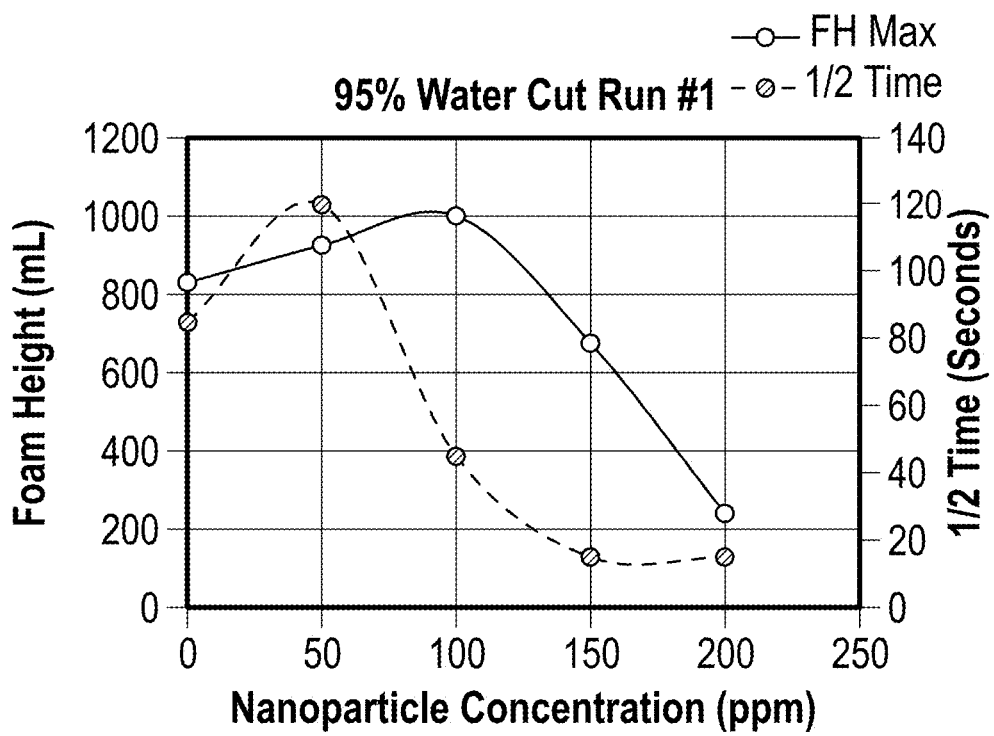
FIG. 4A shows a graph measuring the maximum foam height (ml) and the half-life of the foam at each NP concentration tested in FIG. 3A as described in Example 2.
Figure 4B:
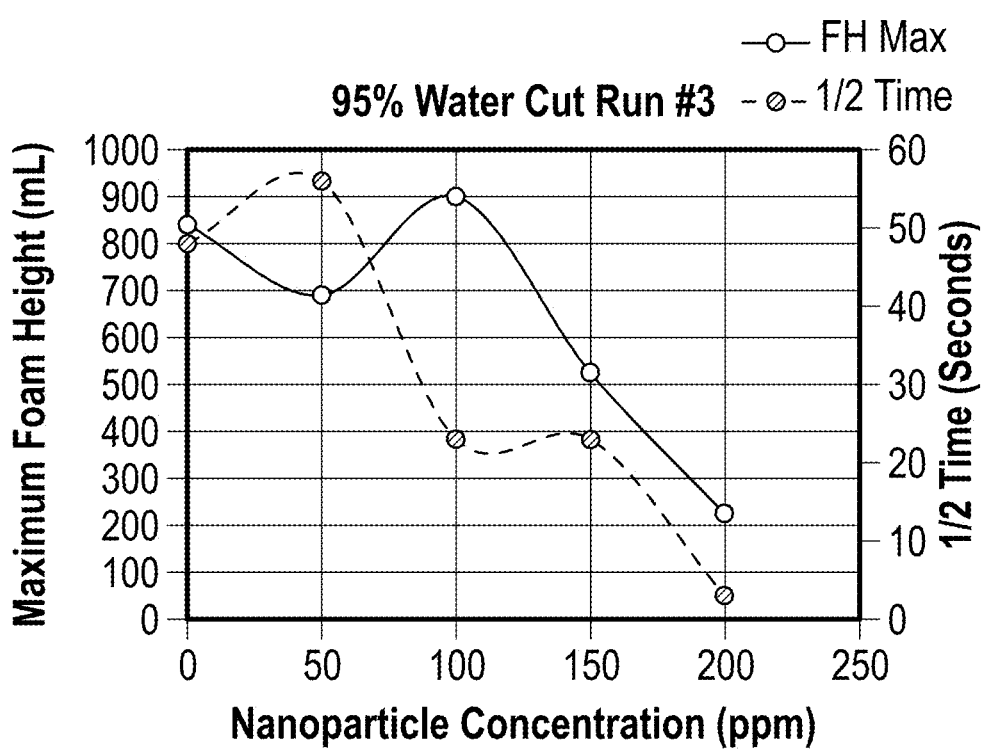
FIG. 4B shows a graph measuring the maximum foam height (ml) and the half-life of the foam at each NP concentration tested in FIG. 3B as described in Example 2.

Additional testing according to the methods described in Example 1 was conducted in a 95% water cut. The results are shown in FIGS. 3A-3B, where the nanoparticle (NP) alone did not show improvement above a blank (No additives) test point as a negative control, as shown in FIG. 3B. The combinations of NP and alkyl betaine surfactant showed improvement by increased foam height. Again the best performance was achieved at a 1:1 ratio of the NP to alkyl betaine surfactant (100 ppm/100 ppm). The measurement of maximum foam height and foam half-life is shown in FIGS. 4A-4B, where the 1:1 ratio (100 ppm NP) showed the greatest maximum foam height, again demonstrating best performance achieved at a 1:1 ratio of the NP to alkyl betaine surfactant (100 ppm/100 ppm). In these tests the longest foam half-life was achieved from the 50 ppm NP/150 ppm alkyl betaine.

All test series showed a benefit of the inclusion of the NP (including at 50 ppm) to extend the half-life of the foam, indicative of decreasing the density of the treated fluid. In applications of use both foam height and foam half-life (i.e. stability) are important.

Example 3

Figure 5:
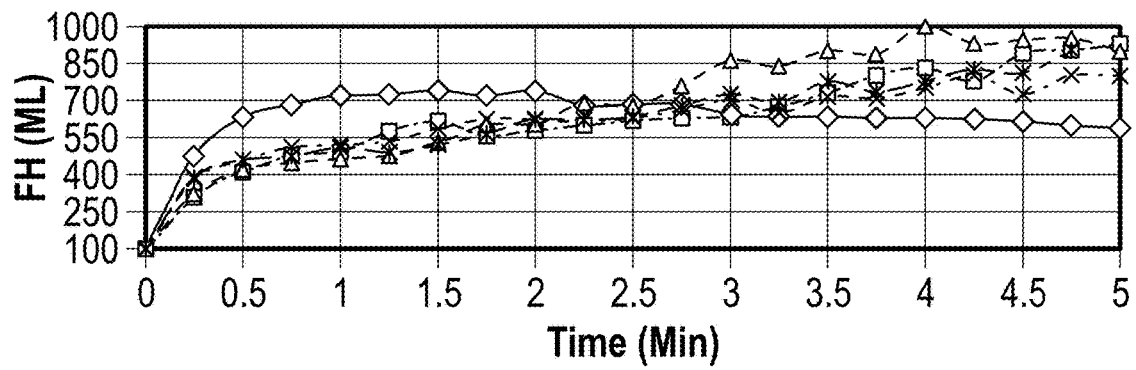
FIG. 5 shows a graph measuring the foam height (ml) over time in 95% water cut fluid for various runs described in Example 3.

Additional foam height testing was conducted according to the methods described in Example 1 in another 95% water cut over 4 runs of testing the 100 ppm NP/100 ppm alkyl betaine surfactant compared to the 200 ppm alkyl betaine surfactant alone. The foam stability of each run was measured and indicated for each run in terms of the foam half-life (HL) measured in seconds. The results are shown in FIG. 5 where the graph shows that over time the tested compositions outperform the alkyl betaine surfactant alone for increasing the foam height of the fluid. The foam height results of all 4 runs consistently shows that foam height built up over time and in the second half of the testing. Although the surfactant alone achieved longer HL in seconds (90 seconds), the third and fourth runs achieved improved foam HL in seconds (70 seconds). Notably emulsions were observed in all runs with the 100 ppm NP/100 ppm alkyl betaine surfactant.

Example 4

Figure 6:
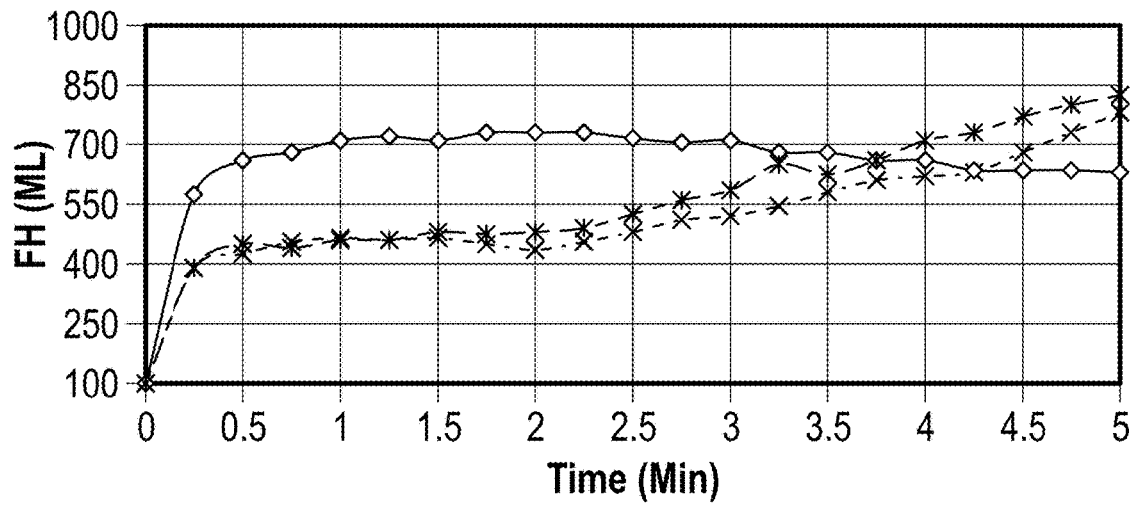
FIG. 6 shows a graph measuring the foam height (ml) over time in 90% water cut fluid for various runs described in Example 4.

Additional foam height testing was conducted according to the methods described in Example 1 in a 90% water cut testing the 100 ppm NP/100 ppm alkyl betaine surfactant compared to the 200 ppm alkyl betaine surfactant alone. The foam stability of each run was measured and indicated for each run in terms of the foam half-life (HL) measured in seconds. The results are shown in FIG. 6 where the graph shows that over time the tested compositions out perform the alkyl betaine surfactant alone for increasing the foam height of the fluid. Again the foam height results shows that foam height built up over time and in the second half of the testing. Although the surfactant alone achieved longer HL in seconds (95 seconds), the tested compositions achieved improved foam HL in seconds (60, 70 seconds). These results tested at a 90% water cut show the significant impact that the hydrocarbon or condensate has on the performance of the gas lift flow improving compositions.

Example 5

Additional foam height testing was conducted according to the methods described in Example 1 in a 95% water cut and at a constant temperature of 65° C. in a field fluid having 18,000 mg/L TDS and pH about 6.5. The testing compared the 100 ppm NP/100 ppm alkyl betaine surfactant compared to the 200 ppm alkyl betaine surfactant alone and 200 ppm NP alone. The foam stability of each run was measured and indicated for each run in terms of the foam half-life (HL) measured in seconds, where the tested composition 1:1 ratio NP to surfactant had a significantly longer half-life measured in seconds.

Figure 7:
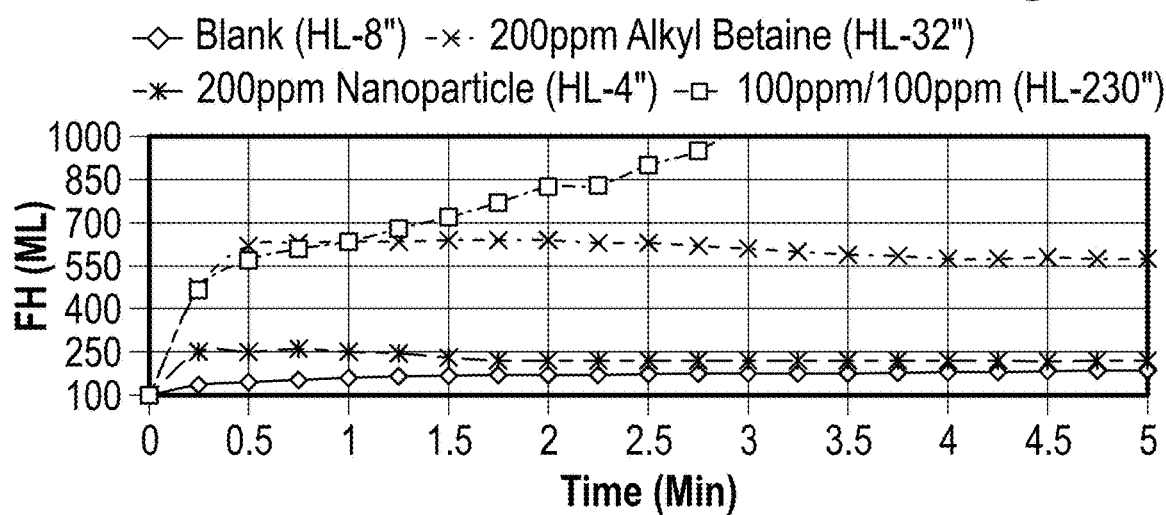
FIG. 7 shows a graph measuring the foam height (ml) over time in 95% water cut fluid with the gas flow lift compositions providing the greatest increase in foam height in a 1:1 ratio of NP to alkyl betaine surfactant as described in Example 5.

The results are shown in FIG. 7 where the graph shows that the tested compositions outperform the alkyl betaine surfactant alone and other tested parameters for increasing the foam height of the fluid. The generated foam reached over 100 ml and overflew the column in less than 3 minutes testing in the 18,000 TDS fluid. The testing in the lower TDS fluid demonstrated further improvements in performance compared to the 150,000 mg/L TDS tested in Examples 1-4.

Example 6

Figure 8:
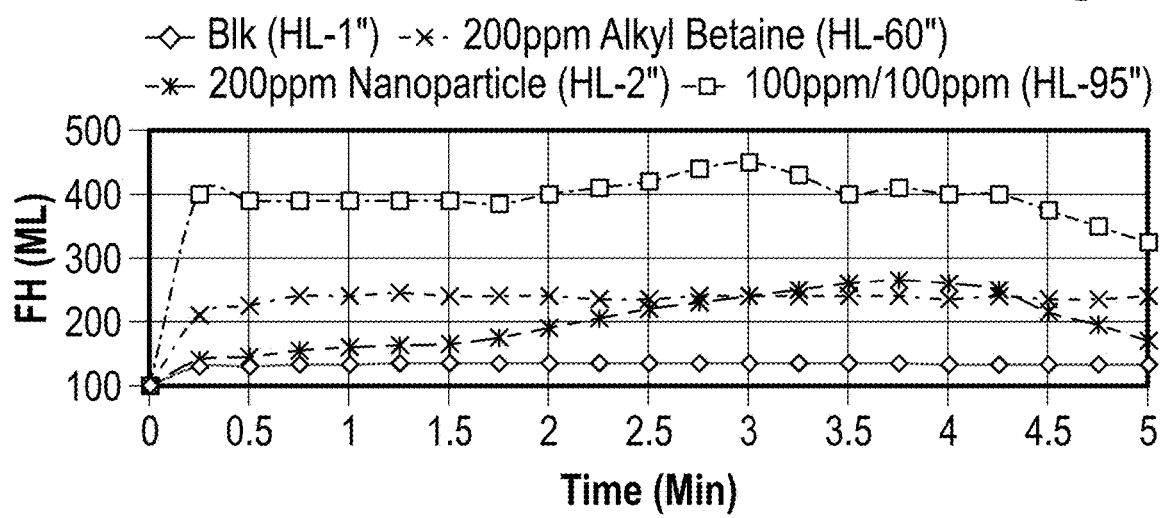
FIG. 8 shows a graph measuring the foam height (ml) over time in 97% water cut fluid with the gas flow lift compositions providing the greatest increase in foam height in a 1:1 ratio of NP to alkyl betaine surfactant as described in Example 6.

Additional foam height testing was conducted according to the methods described in Example 1 in a 97% water cut and at a constant temperature of 82° C. in a field fluid having 60,000 mg/L TDS and pH about 8.1. The testing compared the 100 ppm NP/100 ppm alkyl betaine surfactant compared to the 200 ppm alkyl betaine surfactant alone and 200 ppm NP alone, where the tested composition outperformed the standalone samples with foam height about two times that of the standalone samples. The tested composition also provided a stable foam. The results are shown in FIG. 8 where the graph shows that the combination test composition outperforming the alkyl betaine surfactant alone and the nanoparticle alone. Again the testing at a lower TDS of 60,000 mg/L (compared to 150,000 mg/L TDS tested in Examples 1-4) confirmed that lower TDS conditions benefits from the gas lift improver compositions.

Example 7

Figure 9:
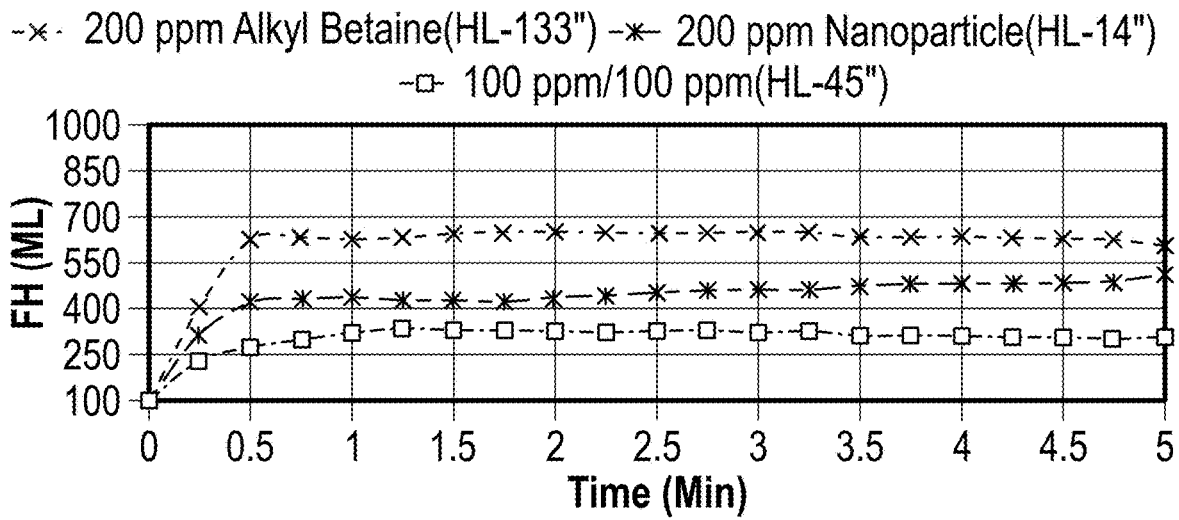
FIG. 9 shows a graph measuring the foam height (ml) over time in 95% water cut fluid with >300,000 TDS showing a negative impact of the TDS on the gas flow lift compositions as described in Example 7.

Additional foam height testing was conducted according to the methods described in Example 1 in a 95% water cut and at a constant temperature of 65° C. in a field fluid having 300,000 mg/L TDS. The testing compared the 100 ppm NP/100 ppm alkyl betaine surfactant compared to the 200 ppm alkyl betaine surfactant alone and 200 ppm NP alone. The results are shown in FIG. 9, where at the elevated TDS (>300,000 mg/L) the test compositions failed to provide a benefit to increasing foam height or significant half-life of the foam.

Example 8

Figure 10:
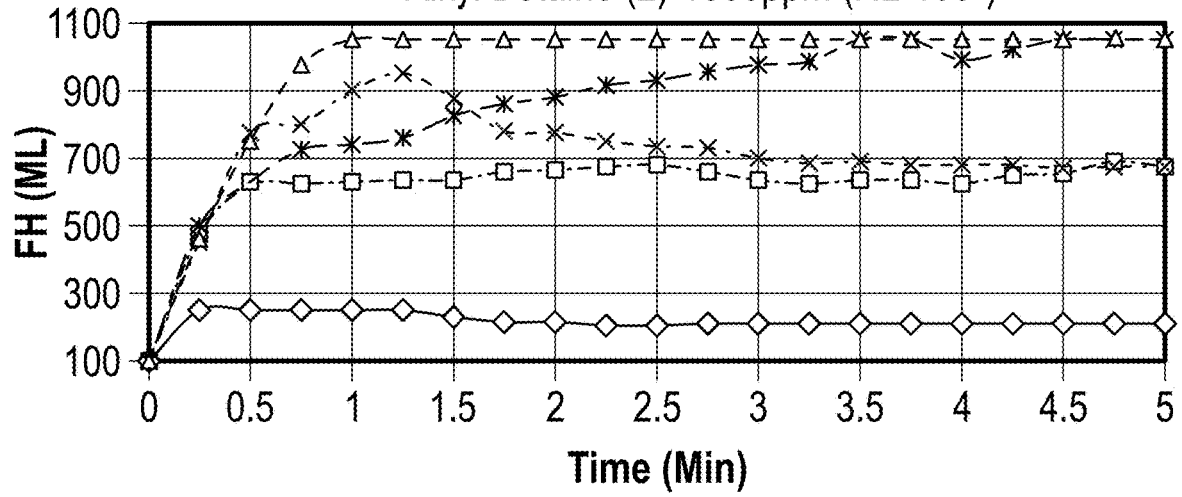
FIG. 10 shows a graph measuring the foam height (ml) over time in 20% water cut Permian fluid comparing alkyl betaine surfactants as described in Example 8.

Additional foam height testing to evaluate additional alkyl betaine surfactants was conducted. Cocamidopropyl betaine surfactant in addition to Lauramidopropyl betaine surfactant previously evaluated were compared in Permian fluids at a 20% water cut at 1000 and 2000 ppm. Higher dosages of the foaming surfactants were evaluated due to the chemistry difference of the fluids and test done on field brine with an approximate TDS of 150,000 mg/L from typical Permian water. The results are shown in FIG. 10, where both alkyl betaine surfactants provide benefits in increasing foam height compared to blank, with further benefit achieved from the 2000 ppm tests. The cocamidopropyl betaine surfactant provided increased HL in seconds compared to the Lauramidopropyl betaine surfactant.

Figure 11:
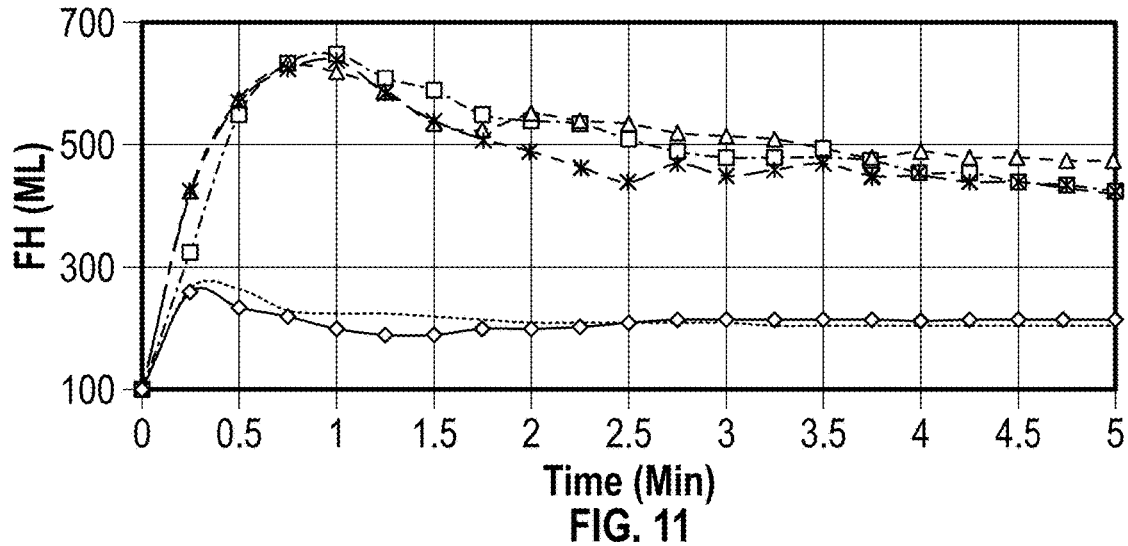
FIG. 11 shows a graph measuring the foam height (ml) over time in 20% water cut Permian fluid comparing an alkyl betaine surfactant combined with glymo-modified nanoparticles as described in Example 8.

Additional testing with the Cocamidopropyl betaine surfactant with functionalized nanoparticles was conducted in the Permian fluids. A colloidal silica NP modified with glycidyloxypropyltrimethoxy silane (glymo-NP) was combined at varying concentration ratios with the Cocamidopropyl betaine surfactant as shown in FIG. 11. The tests compared IA 10% glymo-NP with 90% surfactant, ID 50% glymo-NP with 50% surfactant, to the surfactant alone, glymo-NP alone and a blank test. The glymo-NP alone was equivalent to a blank (negative control) whereas the inclusion of the glymo-NP with the Cocamidopropyl betaine surfactant provided at least equivalent performance at equal actives to the surfactant alone. In this example further optimization of ratios would provide enhanced benefits.

Figure 12:
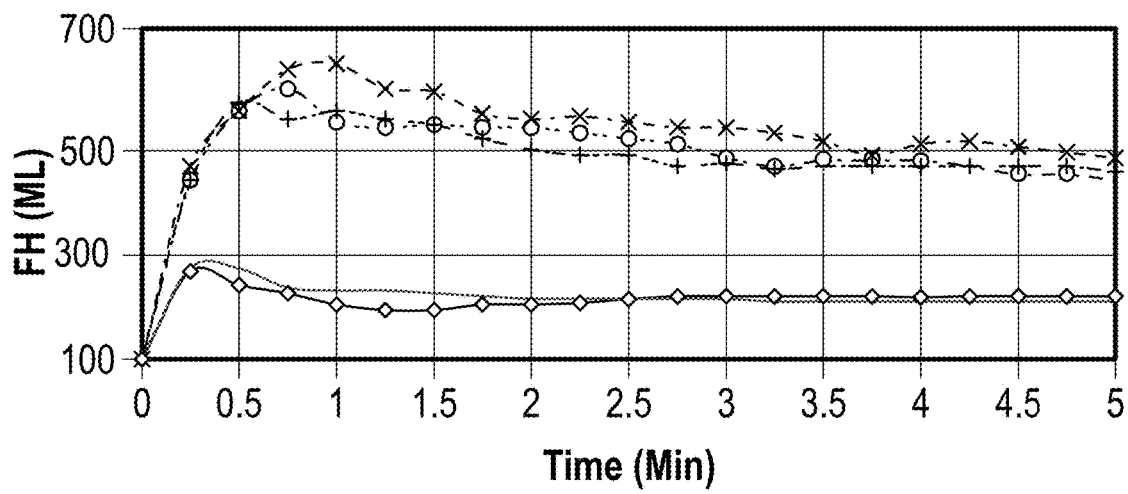
FIG. 12 shows a graph measuring the foam height (ml) over time in 20% water cut Permian fluid comparing another alkyl betaine surfactant combined with glymo-modified nanoparticles as described in Example 8.

Additional testing with the Lauroylamide propylbetaine surfactant with functionalized nanoparticles was conducted in the Permian fluids. The glymo-NP was combined at varying concentration ratios with the Lauroylamide propylbetaine surfactant as shown in FIG. 12. The tests compared IIA 10% glymo-NP with 90% surfactant, IID 50% glymo-NP with 50% surfactant, to the surfactant alone, glymo-NP alone and a blank test. The glymo-NP alone was equivalent to a blank (negative control) whereas the inclusion of the glymo-NP with the Lauroylamide propylbetaine surfactant provided approximately equivalent performance at equal actives to the surfactant alone. The results show that the performance of NP with surfactant is approximately equivalent at the equal actives (exclude the NP-alone testing).

Example 9

Additional foam height testing to evaluate additional nanoparticle and surfactant combinations for gas lift flow improving compositions were conducted. An APTMS Functionalized GLYMO-nanosilica (amine-modified nanoparticle or amine-NP) was prepared by combining silica nanoparticles with (3-Glycidoxypropyl) trimethoxysilane to create a functionalized nanoparticle with a GLYMO coating. The functionalized colloidal nanosilica was combined with distilled water (activity of the colloidal silica in the reactor was 3 wt. %) and (3-aminopropyl) trimethoxysilane (APTMS) was added to the silica dispersion at controlled mixing and temperature. The amine-NP was tested alone in comparison to a blank test and an anionic surfactant alone, compared to a 2:1 amine-NP to Dowfax 3B2 combination where each were compared at 1000 ppm product based on total fluids.

Figure 13:
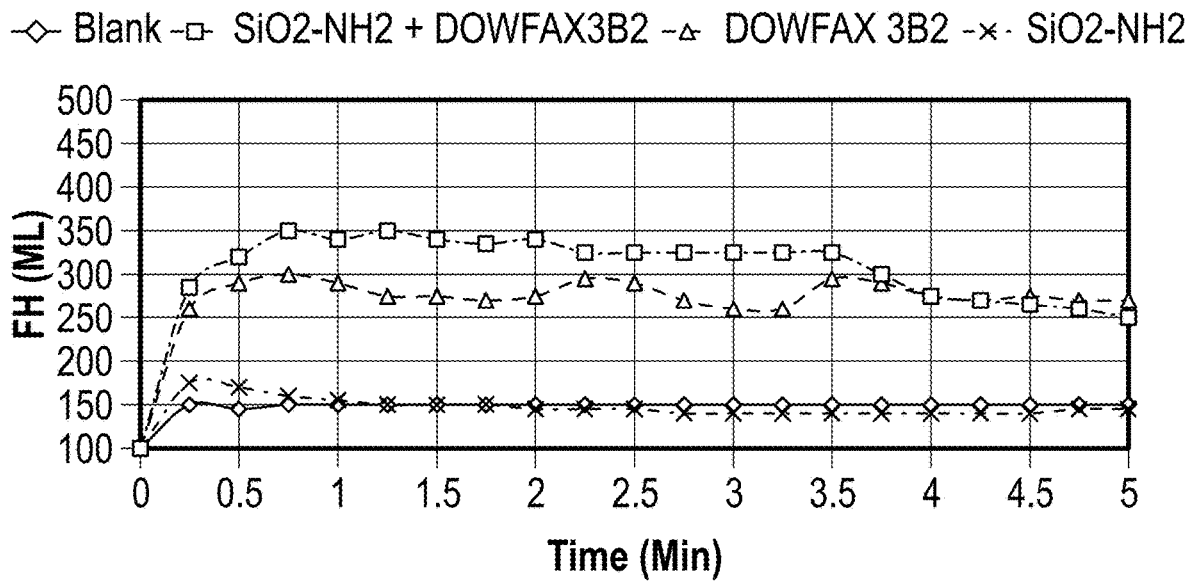
FIG. 13 shows a graph measuring the foam height (ml) over time in 20% water cut Permian fluid comparing another alkyl betaine surfactant combined with amine-functionalized nanoparticles as described in Example 9.
Figure 14:
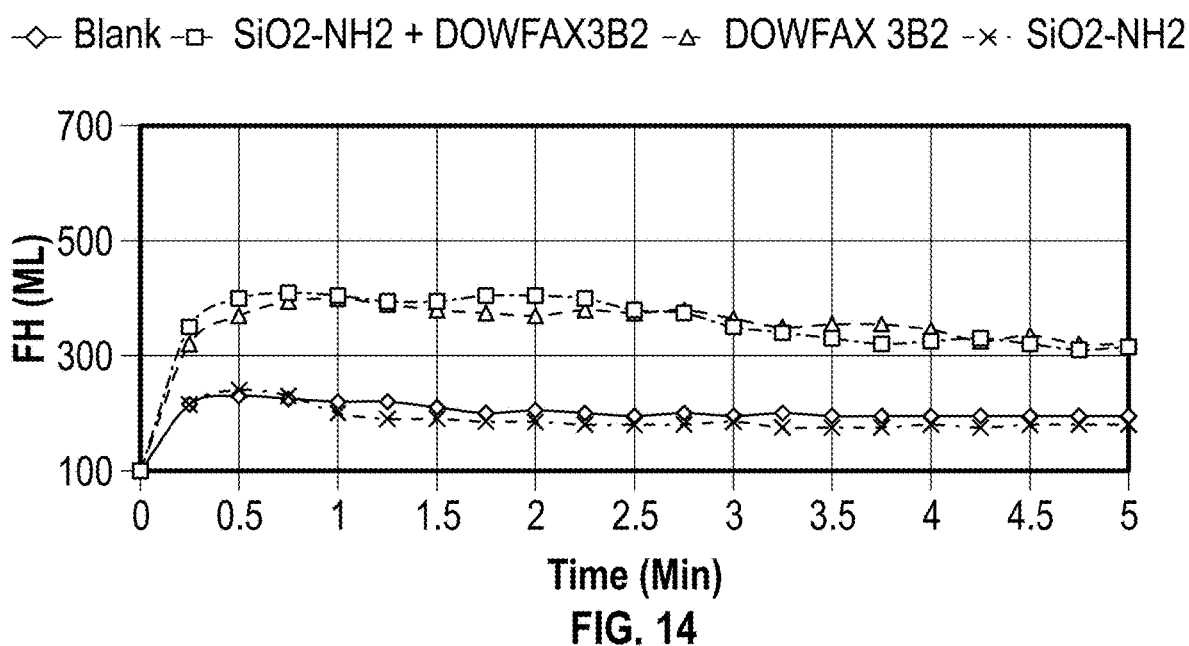
FIG. 14 shows a graph measuring the foam height (ml) over time in 80% water cut Permian fluid comparing another alkyl betaine surfactant combined with amine-functionalized nanoparticles as described in Example 9.

The results are shown in FIG. 13 testing the combinations at a 20% water cut fluid. Further testing and results are shown in FIG. 14 testing the combinations at an 80% water cut fluid. The figures show a benefit of the gas lift flow improving compositions at a 20% water cut fluid only.

It is to be understood that while the disclosure has been described in conjunction with the detailed description thereof, the foregoing description is intended to illustrate, and not limit the scope of the disclosure, which is defined by the scope of the appended claims. Other embodiments, advantages, and modifications are within the scope of the following claims. Any reference to accompanying drawings which form a part hereof, are shown, by way of illustration only. It is understood that other embodiments may be utilized, and structural changes may be made without departing from the scope of the present disclosure. All publications discussed and/or referenced herein are incorporated herein in their entirety.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the disclosure in diverse forms thereof.

What is claimed is:

1. A gas lift flow improving composition comprising:
   a functionalized nanoparticle, wherein the functionalized nanoparticle has an average particle size from about 1 nm to about 1000 nm, and
   has a core-shell nanoparticle morphology comprising a trialkoxyorganosilane coated nanoparticle core and an amine functionalized group on the surface of the nanoparticle as a shell, wherein the trialkoxyorganosilane is an epoxy functional silane, hydroxylic hydrophilic silane, hydroxyl functional silane, or thiol functional silane, wherein the amine functionalized group is covalently bonded to the trialkoxyorganosilane coated nanoparticle, and wherein the molar ratio of the 1rialkoxyorganosilane to the amine-functionalized silane is about 1:1 to about 100:1, and the mass ratio of the trialkoxyorganosilane coated nanoparticle core to the amine-functionalized silane on the trialkoxyorganosilane is about 1:1 to about 100:1;

a foaming surfactant comprising an amphoteric surfactant; and wherein the gas lift flow improving composition is dispersed in an aqueous medium.

2. The composition of claim 1, wherein ratio of the functionalized nanoparticle to the foaming surfactant is about 1:1 to about 1:100 on an actives (ppm) basis.

3. The composition of claim 1, wherein the foaming surfactant comprises an amphoteric alkyl betaine.

4. The composition of claim 1, wherein the aqueous medium comprises a coupler and/or a solvent.

5. The composition of claim 1, wherein the nanoparticle has an average particle size from about 1 nm to about 500 nm and wherein the nanoparticles are selected from the group consisting of silica and metal-based nanoparticles.

6. The composition of claim 5, wherein the silica is selected from the group consisting of colloidal silica, nanosilica, silicate nanoparticle, polyhedral oligomeric silsesquioxane nanoparticle, and silicon dioxide nanoparticle dispersion.

7. The composition of claim 1, wherein the trialkoxyorganosilane comprises one or more of 3-glycidoxypropyltrimethoxysilane, 3-glycidoxypropylmethyldimethoxysilane, 3-glycidoxypropylmethyldiethoxysilane, 3-glycidoxypropyltriethoxysilane, 2-(3,4-epoxycyclohexyl)propyltrimethoxysilane, 2-(3,4epoxycyclohexyl)propyltriethoxysilane, 2-(3,4-epoxycyclohexyl)ethyltrimethoxysilane, 2-(3,4-epoxycyclohexyl)ethyltriethoxysilane, 2-(3,4-epoxycyclohexyl)methyltrimethoxysilane, 2-(3,4epoxycyclohexyl)methyltriethoxysilane, [(3-ethyl-3 oxethanyl)methoxy]propyltrimethoxysilane, or [(3-ethyl-3-oxethanyl)methoxy]propyltriethoxysilane.

8. The composition of claim 1, wherein the amine functionalized group is provided by an amine-functionalized silane according to formula I or II,

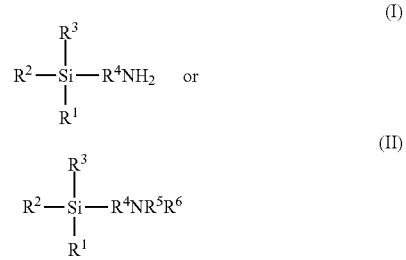

wherein:

$R^1$, $R^2$, and $R^3$ are independently -OMCH$_3$, —OH,-CH$_3$, or-Cl and wherein M is absent, —(CH$_2$)$_m$—, or —(CH$_2$Y)$_n$—, wherein m is an integer from 1 to 5, n is an integer from 1 to 5, wherein Y is O, N, or S; and $R^4$ is —CH$_2$, or a substituted or an unsubstituted, linear or branched C2-C20 alkyl group, or —(Ar)—;

$R^5$ is absent or H; and $R^6$ is —CH$_3$, a substituted or an unsubstituted, linear or branched C2-C20 alkyl group or a primary, secondary, tertiary or quaternary alkyl amine, —(Ar)—, =(CNH$_2$NH$_2$), —((CH$_2$)$_o$NH$_2$), —((CH$_2$)$_o$NH(CH$_3$), —((CH$_2$)$_o$NH(CH$_2$)$_p$NH$_2$), —((CH$_2$)$_o$NH(CH$_2$)$_p$Ar), wherein o and p are independently integers from 1 to 15.

9. The composition of claim 1, wherein the functionalized nanoparticle is a reaction product obtained by a first step of coating a nanoparticle with a trialkoxyorganosilane and thereafter covalently bonding an amine-functionalized silane to the surface of the coated nanoparticle.

10. The composition of claim 1, wherein the functionalized nanoparticle comprises from about 20-80 wt-% of the composition, wherein the foaming surfactant comprises from about 10-60 wt-% of the composition, and wherein the aqueous medium comprises from about 10-30 wt-% of the composition.

11. The composition of claim 1, further comprising a corrosion inhibitor, scale inhibitor, or combinations thereof.

* * * * *